United States Patent
P K et al.

(10) Patent No.: US 11,710,064 B2
(45) Date of Patent: Jul. 25, 2023

(54) MACHINE LEARNING ANALYSIS OF USER INTERFACE DESIGN

(71) Applicant: SAP SE, Walldorf (DE)

(72) Inventors: Sumaiya P K, Bangalore (IN); Rajesh V, Bangalore (IN); Natarajan Devaraj, Bangalore (IN); Rohith M K, Bangalore (IN); Jumi Bhattacharyya, Bangalore (IN); Sangeetha Baburaj, Bangalore (IN); Basavana Gouda S, Bellary (IN); Sai Bandaru, Visakhapatnam (IN)

(73) Assignee: SAP SE, Walldorf (DE)

( * ) Notice: Subject to any disclaimer, the term of this patent is extended or adjusted under 35 U.S.C. 154(b) by 1304 days.

(21) Appl. No.: 16/032,325

(22) Filed: Jul. 11, 2018

(65) Prior Publication Data
US 2020/0019418 A1    Jan. 16, 2020

(51) Int. Cl.
*G06F 3/0482*    (2013.01)
*G06N 20/00*    (2019.01)
*G06F 9/451*    (2018.01)
*G06F 11/34*    (2006.01)
*G06F 17/18*    (2006.01)
(Continued)

(52) U.S. Cl.
CPC ............. *G06N 20/00* (2019.01); *G06F 9/453* (2018.02); *G06F 11/3438* (2013.01); *G06F 17/18* (2013.01); *G06F 18/2148* (2023.01); *G06F 18/24* (2023.01)

(58) Field of Classification Search
CPC ....................................................... G06F 9/451
See application file for complete search history.

(56) References Cited

U.S. PATENT DOCUMENTS

| | | | | |
|---|---|---|---|---|
| 2014/0172569 A1* | 6/2014 | Banda | ................... | G06Q 30/02 705/14.55 |
| 2016/0259840 A1* | 9/2016 | Zheng | ................... | G06F 16/958 |

(Continued)

OTHER PUBLICATIONS

"Model-View-Controller (MVC) Explained Through Ordering Drinks at the Bar," retrieved from: https://medium.freecodecamp.org/model-view-controller-mvc-explained- . . . 1, Jun. 9, 2018, 4 pages.

(Continued)

*Primary Examiner* — Di Xiao
(74) *Attorney, Agent, or Firm* — Klarquist Sparkman, LLP

(57) ABSTRACT

Techniques and solutions are described for improving user interfaces, such as by analyzing user interactions with a user interface with a machine learning component. The machine learning component can be trained with user interaction data that includes an interaction identifier and a timestamp. The identifiers and timestamps can be used to determine the duration of an interaction with a user interface element, as well as patterns of interactions. Training data can be used to establish baseline or threshold values or ranges for particular user interface elements or types of user interface elements. Test data can be obtained that includes identifiers and timestamps. The time taken to complete an interaction with a user interface element, and optionally an interaction pattern, can be analyzed. If the machine learning component determines that an interaction time or pattern is abnormal, various actions can be taken, such as providing a report or user interface guidance.

20 Claims, 17 Drawing Sheets

(51) Int. Cl.
*G06F 18/24* (2023.01)
*G06F 18/214* (2023.01)

(56) References Cited

U.S. PATENT DOCUMENTS

| | | | | |
|---|---|---|---|---|
| 2016/0378642 | A1* | 12/2016 | Adams | G06F 3/04842 717/125 |
| 2017/0124700 | A1* | 5/2017 | Sarojam | A61B 8/523 |
| 2017/0286389 | A1* | 10/2017 | Ceneviva | G06F 40/106 |
| 2018/0018307 | A1* | 1/2018 | Wu | G06F 3/0484 |
| 2018/0074580 | A1* | 3/2018 | Hardee | G03H 1/0005 |
| 2018/0288074 | A1* | 10/2018 | Thayer | H04L 63/145 |
| 2018/0335968 | A1* | 11/2018 | Pauley | G06F 3/068 |
| 2019/0068458 | A1* | 2/2019 | Stefanov | G06F 9/5077 |
| 2019/0268537 | A1* | 8/2019 | Jang | G06F 21/32 |
| 2019/0361579 | A1* | 11/2019 | Srivastava | G06F 3/04886 |

OTHER PUBLICATIONS

"Model-view-controller," *Wikipedia*, May 21, 2018, 4 pages.
"Step 15: Nested Views," SAP, retrieved from: https://help.sap.com/saphelp_uiaddon20/helpdata/en/df/8c9c3d79b54c928855162bafcd88ee/content.htm, Jun. 7, 2018, 1 page.
Knorr et al., "Algorithms for Mining Distance-Based Outliers in Large Datasets," *Proceedings of the 24th VLDB Conference*, New York, 1998, 12 pages.
Model View Controller Explained (/blog/software-design/model-view-controller-explained/), retrieved from: https://www.tomdalling.com/blog/software-design/model-view-controlle/, May 31, 2009, 6 pages.
"Step 4: XML Views," SAP, retrieved from: https://help.sap.com/saphelp_uiaddon20/helpdata/en/df/8c9c3d79b54c928855162bafcd88ee/frameset.htm, Jun. 7, 2018, 2 pages.
"Step 5: Controllers," SAP, retrieved from: https://help.sap.com/saphelp_uiaddon20/helpdata/en/df/8c9c3d79b54c928855162bafcd88ee/frameset.htm, Jun. 7, 2018, 2 pages.
"Understanding Model-View-Controller," Coding Horror, retrieved from: https://blog.codinghorror.com/understanding-model-view-controller/, May 5, 2008, 5 pages.
"Reading 5: UI Software Architecture," retrieved from: http://web.mit.edu/6-813/www/sp17/classes/05-ui-sw-arch/, Jun. 9, 2018, 7 pages.
"Context Binding (Element Binding)," retrieved from: https://sapui5.hana.ondemand.com/sdk/#/topic/91f05e8b6f4d1014b6dd9, Jun. 7, 2018, 1 page.
"Integrate a New View," retrieved from: https://sapui5.hana.ondemand.com/sdk/#/topic/91f05e8b6f4d1014b6dd9, Jun. 7, 2018, 1 page.

* cited by examiner

| User ID | App Name | Page/View Name | Control ID | Event | Time |
|---|---|---|---|---|---|
| 001 | Demo | _page0 | _button0 | press | 09:03:2019:11:11:23 |
| 001 | Demo | _page0 | _xmlview0_userid_input_id | liveChange | 09:03:2019:11:11:30 |
| 001 | Demo | _page0 | _xmlview0_userid_input_id | change | 09:03:2019:11:12:12 |
| 001 | Demo | _page0 | _button1 | press | 09:03:2019:11:12:18 |
| 001 | Demo | _page1 | _xmlview0_userid_input_id | change | 09:03:2019:11:12:59 |
| 001 | Demo | _page1 | _button5 | press | 09:03:2019:11:13:12 |
| 001 | Demo | _page1 | _xmlview0_userid_input_id | liveChange | 09:03:2019:11:14:33 |
| 001 | Demo | _page1 | _xmlview0_userid_input_id | change | 09:03:2019:11:14:49 |
| 001 | Demo | _page1 | _slider2 | liveChange | 09:03:2019:11:15:05 |
| 002 | Demo | _page0 | _button0 | press | 08:21:2019:08:43:12 |
| 002 | Demo | _page0 | _xmlview0_userid_input_id | liveChange | 08:21:2019:08:45:51 |
| 002 | Demo | _page0 | _button8 | change | 08:21:2019:08:48:28 |
| 002 | Demo | _page1 | _xmlview0_userid_input_id | press | 08:21:2019:08:48:42 |
| 002 | Demo | _page1 | _xmlview0_userid_input_id | liveChange | 08:21:2019:08:49:03 |

FIG. 5

```
808 {                                                    808
    "_id": "59b8d72ff2e6af001e5805ae",
    "controlId": "__button0",
    "timestamp": "2017-09-13T06:58:55.014Z",
808 "event": "press",                                    812
    "parent": "__page0", 808
    "AppName": "CloudReportingDemo"
},                                              808             800

816
820 {
    "_id": "59b8d756f2e6af001e5805b2",
    "controlId": "__xmlview0--userid_input_id",
828 "timestamp": "2017-09-13T06:59:34.016Z",
    "event": "liveChange",                               824
    "parent": "__xmlview0--userid",
832 "AppName": "CloudReportingDemo"
},                                                       836

816
820 {
    "_id": "5a0042b8014f76001f319d70",
    "controlId": "__xmlview0--userid_input_id",
828 "timestamp": "2017-11-06T11:08:40.491Z",
    "event": "change",                                   824
    "parent": "__xmlview0--userid",
832 "AppName": "CloudReportingDemo"
},                                                       836
```

FIG. 8

```
sap.ui.define([
   "sap/ui/core/mvc/Controller"
], function (Controller) {
   "use strict";

return Controller.extend("CloudReportingDemo.controller.BaseController", {
      onAfterRendering: function (oEvent) {
         sap.ui.getCore().appName = this.getOwnerComponent().getManifestObject()._oManifest["sap.app"].id;

if(this._onAfterRendering){
            this._onAfterRendering(oEvent);
         }
         var elements = document.getElementsByClassName("user-activity-record");
         for (var i = 0; i < elements.length; i++) {
            var element = sap.ui.getCore().byId(elements[i].id);
            var type = element.getMetadata().getElementName();
            switch (type) {
               case "sap.m.Button":
                  this.sapMButtonListener(element); break;
               case "sap.m.Input":
                  this.sapMInputListner(element); break;
            }
         }
      },
      sapMButtonListener: function (button) {
         button.attachPress(this.AppendEvent);
      },
      sapMInputListner: function(input){
         input.attachLiveChange(this.AppendEvent);          910
         input.attachChange(this.AppendEvent);
         input.attachSubmit(this.AppendEvent);
      },
      AppendEvent: function (oEvent) {
         var data = {
            controlId: oEvent.getSource().getId(),      920
            timestamp: new Date(),
            event: oEvent.getId(),
            parent: oEvent.getSource().getParent().getId(),
            AppName: sap.ui.getCore().appName };
         $.ajax({
                              url: "/destinations/CloudReporting/api/v1/ClickStream/",
                              contentType: 'application/json',
                              type: "POST",
                              data: JSON.stringify(data),
                              dataType: "json",
                              success: function(response) {
                                       console.log(response);
                              }
                        });
               }
   });
});
```

FIG. 9

```xml
<mvc:View controllerName="CloudReportingDemo.controller.View1" xmlns:html="http://www.w3.org/1999/xhtml" xmlns:mvc="sap.ui.core.mvc"displayBlock="true" xmlns="sap.m">  ⟵ 1000
<App>
    <pages>
        <Page title="{i18n>title}">
            <content>  ⟵ 1010
                <InputListItem label="UserName" id="userid" >  ⟵ 1010
                    <content>
                        <Input liveChange="save" ariaLabelledBy="__item1-label" value="" width="600px" id="userid_input_id" class="user-activity-record"/>  ⟵ 1014, 1018
                    </content>
                </InputListItem>
                <InputListItem label="Qualification" id="qualification" >
                    <content>
                        <Input liveChange="save" ariaLabelledBy="__item1-label" value="" width="600px" id="qualificaion_id" />
                    </content>
                </InputListItem>
                <Button text="Hello" class="user-activity-record"></Button>
            </content>
        </Page>
    </pages>
</App>
</mvc:View>
```

MACHINE LEARNING ANALYSIS OF USER INTERFACE DESIGN

FIELD

The present disclosure generally relates to machine learning analysis of user interfaces. Particular implementations relate to the analysis, and optionally correction, of design issues relating to user interface elements.

BACKGROUND

User interfaces are an important part of software design. All the effort put into producing efficient code and providing valuable features may be for naught if end users are not able to effectively interact with an application. Unfortunately, it can be difficult to predict how users may interact with a software application, and thus optimally design a user interface. Although it may be possible to perform end user testing prior to a software release, such testing can be expensive and time consuming, and may still fail to identify problems that users may experience, including those based on changing use patterns associated with the application. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for improving user interfaces, such as by analyzing user interactions with a user interface with a machine learning component. The machine learning component can be trained with user interaction data that includes an interaction identifier and a timestamp. The identifiers and timestamps can be used to determine the duration of an interaction with a user interface element, as well as patterns of interactions (e.g., a number of times or a sequence in which a particular user interface element, or multiple user interface elements, was activated, including considering the time intervals between such interactions). Training data can be used to establish baseline or threshold values or ranges for particular user interface elements or types of user interface elements. Test data can be obtained that includes identifiers and timestamps. The time taken to complete an interaction with a user interface element, and optionally an interaction pattern (e.g., considering a number of times a particular user interface element was activated or a sequence of interactions involving multiple user interface elements) can be analyzed using the machine learning component. If the machine learning component determines that an interaction time, a number of interactions, a pattern, or a combination thereof is abnormal, various actions can be taken, such as providing a report or user interface guidance.

In one embodiment, a method is provided for detecting user interface design issues. A plurality of user interface interactions with at least a portion of a plurality of user interface elements are detected. Test event data is captured for the detected plurality of user interface actions. The test event data includes an event identifier and a timestamp. The test event data is provided to a machine learning component. The machine learning component was trained with training set data that includes event identifiers and timestamps. A classification result is received. The classification result identifies at least one user interface element associated with a potential design issue.

In another aspect, a method is provided that can be carried out using a system that implements a user interface design analyzer. Training data is received that includes a plurality of training user interface interaction records. The user interface interaction records include event identifiers and timestamps. A regression-based machine learning component is trained using the training data.

Test data is received that includes at least one user interface interaction record. The at least one user interface interaction record includes an event identifier and a timestamp. It is determined that the at least one user interface interaction record is associated with an interaction time having greater than a threshold distance from a value associated with the machine learning component. A display is rendered based on the determination that the at least one user interface element has greater than the threshold difference. The display includes that at least one user interface element or an identifier of the at least one user interface element.

In a further aspect, a method is provided for facilitating the improvement of user interface designs. A plurality of user interactions with one or more user interfaces, which include a plurality of user interface elements, are tracked. In response to the tracking, a plurality of user interaction records are generated. The user interaction records include timestamps. From the plurality of user interaction records, one or both of a time taken to activate a respective user interface element and a time taken to complete an interaction with a respective user interface element are determined. Using a trained machine learning component, it is determined that one or more of the times taken to activate a respective user interface element, one or more of the times taken to complete an interaction with a respective user interface element, or a combination thereof, fail to satisfy a threshold. In response to determining that one or more of the user interface elements fail to satisfy a threshold, a display is generated that includes the at least one user interface element or an identifier of the at least one user interface element.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 5 is a table illustrating example values that can be captured for user interactions with user interface elements, and can be used as training data or test data.

FIG. 8 is example JSON code representing semi-structured user interface interaction data that can be used as training data or which can be test data to be evaluated using a trained machine learning component.

FIG. 9 is example code for a controller implementing disclosed techniques.

FIG. 10 is example code for a view implementing disclosed techniques.

DETAILED DESCRIPTION

Example 1—Overview

Figure 1:
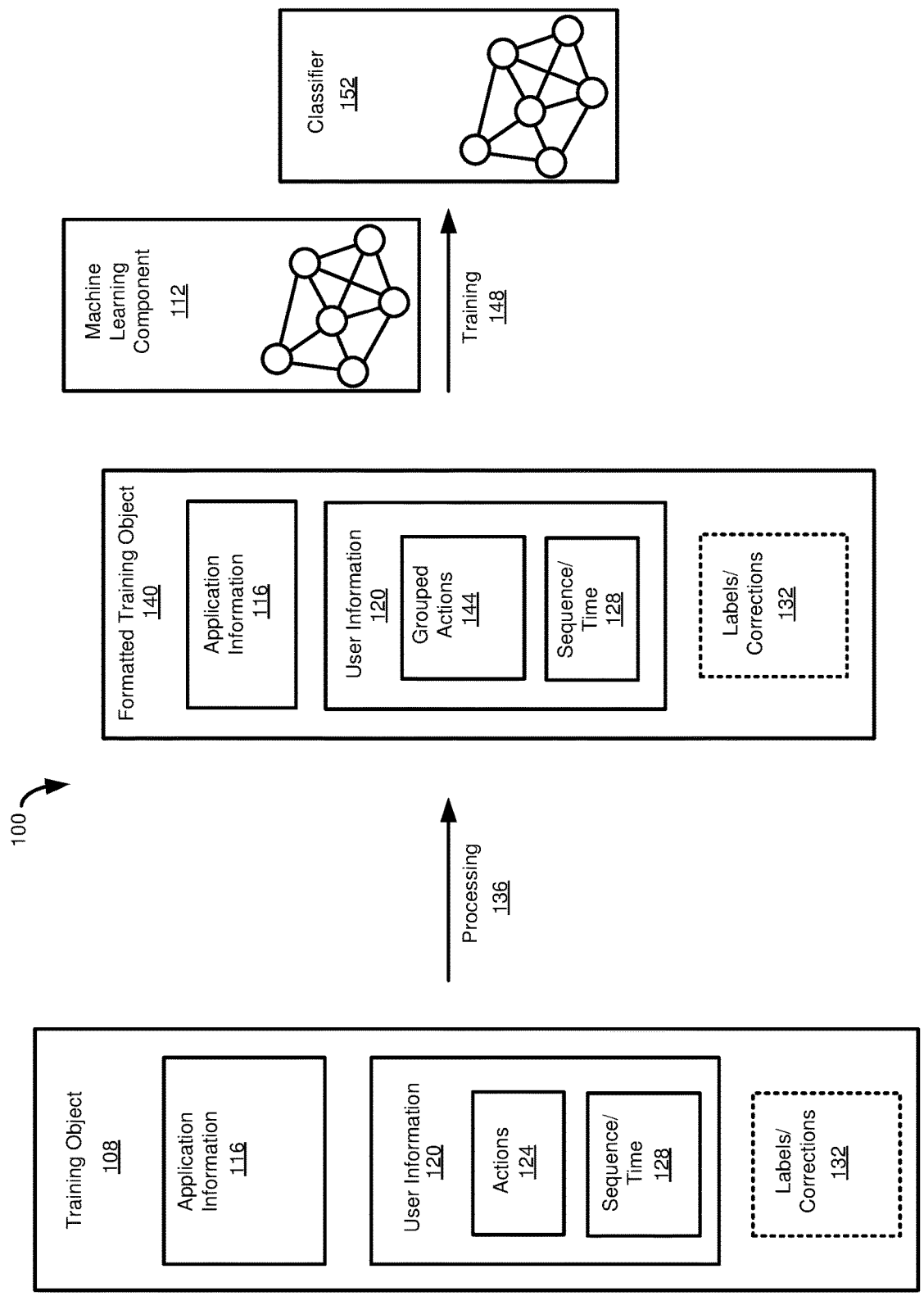
FIG. 1 is a schematic diagram illustrating how a machine learning component can be trained using training data.

User interfaces are an important part of software design. All the effort put into producing efficient code and providing valuable features may be for naught if end users are not able to effectively interact with an application. Unfortunately, it can be difficult to predict how users may interact with a software application, and thus optimally design a user interface. Although it may be possible to perform end user testing prior to a software release, such testing can be expensive and time consuming, and may still fail to identify problems that users may experience, including those based on changing use patterns associated with the application. Accordingly, room for improvement exists.

Even determining that a user interface issue exists may be problematic. For example, it may be difficult to determine why a particular workflow is taking a particular amount of time, or whether this time should be considered excessive. That is, it may be difficult to tell if the amount of time is inherent in the complexity of the subject matter, or if sub-optimal user interface design is creating an unnecessary bottleneck. Even if a potential problem is identified, it can be difficult to determine how to resolve it. Further, even if a problem is identified and can be fixed, it may take time before the update can be deployed.

In some aspects, disclosed technologies provide for automatic analysis of user interactions with a user interface to determine when a user interface issue may exist. User interaction data can be determined by monitoring interactions with user interface elements. For example, user interactions, including in the form of a "click stream" can be captured. Whenever a user interacts with all or a portion of user interface elements, a record can be generated of such interaction.

User interactions can include selecting buttons or other user interface controls, moving a pointer or cursor, or entering text in text boxes or fields. Records can include information such as an identity of a selected control, a category of a selected control, a label or other metadata associated with a control, a time the interaction began, a time the interaction ended, a duration of the interaction, an identifier of a user who interacted with the control, an application identifier, an application version identifier, an application page, view, or screen identifier, an application page, view, or screen version identifier, a sequence number, other information, or combinations thereof.

A label or metadata associated with a user control can include information such as one more titles or identifiers associated with a control and displayed to a user, font information (e.g., a font type, size, color, or other information regarding a visual style), size information (e.g., a number of pixels, optionally including dimensional information, such as a height and width in terms of pixels associated with the control or a percentage of screen size the control occupies), position information (such as a screen location, including in terms of x and y coordinates on a screen), relations to other user interface elements, other information, and combinations thereof.

A sequence number can include a sequence number in which the control was used or activated (e.g., representing a position in a sequence of actions a user took after a screen was presented to a user or some other action was taken, such as performing a screen refresh operation, saving a file, loading a new file, etc.). A sequence number can also indicate an expected position of the user interface element in an activity, or in relation to another activity. Multiple sequence numbers can be used. For example, a user interface element can be associated with an actual sequence number (i.e., representing an order in which a user actually interacted with the user interface element) and an expected sequence number (i.e., representing an order in which a user interface element is anticipated to be used in a particular workflow).

Successively-activated user interface elements can be associated with a time period. The time period can represent a time between the activation or use of a first user interface element and a time associated with the activation or use of a second user interface element. The time period can be analyzed to determine whether it is appropriate for one or more given user interface element types (including types associated with the first and second user interface elements), a given workflow type, a given application type, a given user type, other factors, or a combination thereof.

A time period between the activation or use of the first and second user interface elements can indicate a time taken by the user to determine a next step in a workflow, the identity of the second user interface element, or the location of the second user interface element. For example, it may be expected that, for a particular application, a user should typically spend 2-20 seconds from selecting a first button to selecting a next button. If user data indicates that a user took, say, 40 seconds to select the second button, it may indicate a problem with a user interface design.

User interface design issues or problems can include the button (or other user interface element) being placed in a location that is not intuitive for the user, having a size that is too small to be easily identifiable, having a label or other identifier that does not sufficiently convey the meaning of the user interface element, having the user interface element be displayed in a portion of the display that is visually cluttered (e.g., close to numerous other user interface elements), that is displayed off-screen (e.g., in a location to which a user must scroll in order to view), or other design issues.

As discussed above, it can be difficult for developers to identify that a user interface issue even exists. Disclosed technologies can thus provide for automated detection of user interface design issues, and can be more sensitive and efficient in identifying issues. Correcting the user interface issues can facilitate user interactions with a display, making use of an application more efficient and enhancing human-computer interactions. Improving user interface design can also reduce computer operations, for example, reducing the number of improper user input events (e.g., a user selecting a wrong button, entering wrong text in a field) and the time, processor use, and memory use in carrying out the original action, and then potentially undoing such operations before a user carries out a "correct" interaction.

Disclosed technologies can also prospectively identify user interface issues. That is, in some cases, an end user, or an entity that provides software to end users, may identify that a problem with a user interface exists, even if they cannot determine its source. For example, users may complain that a user interface is too complicated, too confusing, takes too long, etc. A developer may then try to determine the source of the error and provide a solution. However, at that point the end user and the entity may be frustrated and unhappy. They may be further unhappy and frustrated by the time taken by the developer to address the problem. In some aspects, disclosed technologies can be used to prospectively identify user interface issues before users are aware of a problem. Before an "incident" is reported, developers can be alerted to the existence of a problem, and can prepare a solution. The solution can be developed and deployed more quickly, potentially before users are even consciously aware of a problem or inefficiency.

In further cases, user activity can be monitored and analyzed. If it is determined, such as using a trained machine learning component, that a user is having abnormal interaction times, the user can be provided with guidance, such as in the form of on-screen instructions, to assist the user in interacting with the user interface.

Disclosed technologies can also assist in determining a potential reason for a user interface problem, and can, at least in some cases, even be provided solutions or suggested solutions for the problem. For instance, user data can be analyzed to determine that a particular user interface element may be associated with an issue, and the type of issue may be indicated. A type of issue can be, as described above, a user interface element being too small, displayed in a suboptimal location, having a confusing label or identifier, being in a cluttered screen location, etc.

Corrective actions suggested can be a suggested size, location, or identifier for a user interface element. Corrective actions can also include code or repository objects that can carry out a suggested change. For example, a correction can be implemented, including automatically, where a user interface element is resized, relocated, relabeled, etc. by changing code used to implement or define the user interface element. Or, an object, such as a user interface element or a template for a user interface element, can be identified that can implement a change. The object can be a repository object.

The above described techniques can be implemented using a machine learning technique. Training data can be provided where a classifier is trained to associate particular types of user interface elements with particular sequence times or sequence identifiers. The training data can be labelled to indicate whether the user data is within acceptable parameters or whether the user data indicates an error, such as a problem with the presentation of one or more user interface elements. If a problem is identified in the training data, the problem can be labelled for use in training the classifier.

In addition to being labelled as including a problem, additional information about the problem, or its resolution, can be provided in the training data. For example, a rule or constraint that was violated can be indicated, such as a threshold time being exceeded, optionally with an indication of the extent to which the threshold was exceeded. A problem source can be identified, for instance, a design issue that is likely associated with the user interface issue. The problem source can be, as described above, a user interface element being too small, labelled incorrectly, or being placed at a suboptimal location. A problem solution can be associated with the training data, such as a solution to increase the size of a user interface element (optionally including a suggested size), to reposition a user interface element (optionally including a suggested position), code to implement user interface element changes, locations of objects or templates to implement a user interface change, or a solution of on screen guidance to be provided to a user to help guide a user through a workflow. Problems, problem solutions, and solution implementations can be based on user interface issues that were manually solved, solved using a prior technique, or solved using a disclosed technique (for example, use of the disclosed technologies can be used to produce additional training data that can be used to improve the disclosed technique or to provide enhanced functionality).

The disclosed technologies can provide various advantages. As described above, disclosed technologies can allow user interface design issues to be automatically identified, which can reduce manual effort in identifying and solving such design issues. In at least some cases, user interface design issues can be identified more quickly, including before an incident report or complaint is generated through end user use of the user interface design. Disclosed technologies can also provide more sensitive detection and identification of user interface issues, which can allow designs to be improved more than using manual methods.

Disclosed technologies can be used to identify the source of a design issue, as well as potential steps to address the design issue. Identifying the source of a design issue can allow a developer to more quickly implement a solution to the issue. Suggested solutions, or solution implementations, can be suggested to a user, further reducing development effort to solve a problem. In yet additional aspects, solutions can be automatically implemented, including being automatically implemented when selected or approved by a developer. The improved user interface designs that can result from the disclosed technologies can improve human-computer interactions. These improved interactions can conserve computer resources, such as by having fewer user input elements, and associated processing, being activated in order to accomplish a particular result. Reducing the time between user input events can also more effectively use computing resources, by providing less idle processor time while the processor is awaiting user instructions.

Example 2—Example Training and Use of Machine Learning Component

FIG. 1 is a block diagram illustrating a scenario 100 of how disclosed technologies can use one or more training objects 108 to train a machine learning component 112, which can then be used as a classifier for test, or user, data. A training object 108 can include application information 116 and user information 120.

The application information 116 can be used to help categorize the training object 108. That is, in some cases, training objects 108 and user information 120 to be classified may be associated with a particular application or particular type of application. Or, the application may be associated with an application type, where training data and classification data may be compared even though applications are different. For example, applications may have similar workflows, user interface elements, other features, or combinations thereof, such that user interactions from one application can be relevant to user interactions with another application.

Application information 116 can also include version information, and can include information regarding particular views, screens, or pages that are associated with the application and the user information 120 in the training object 108. In some cases, the application information 116 can be used to determine whether user interface elements are related in a way that may indicate an issue with user interface design, including relationships between user interface elements in a single page, view, or screen, or among different pages, views, or screens. Relationships between user interface elements in different pages, views, or screens can include relationships of user interface elements of a first page, view, or screen that direct a user to a second page, view, or screen (e.g., navigational controls). That is, for example, a design issue can be indicated when a user may have issues determining which user interface element to select to move to a new screen, or in determining which screen they should move to in order to advance a workflow (e.g., a series of actions in order to accomplish a desired result, such as filling out a form).

User information 120 can include information regarding user actions 124 and sequence or temporal information 128. The user actions 124 can represent various user interface elements that may be activated or used by a user. User actions can include, for example, selecting buttons, list elements, scroll bars, or other controls. User actions can include clicking or switching between text entry fields or entry boxes. User actions can include typing or changing text within a text entry field or text box, and actions such as hovering over user interface elements (such as to cause tool tips or other information to be displayed). User actions 124 can be associated with various types of information, including information identifying the particular user interface element that a user interacted with, a type of interaction with the identified user interface element, and a type or other metadata associated with the identified user interface element, such whether the user interface element is a button, text field, etc., and a workflow associated with the user interface element (which, some cases, can be specified by one or more expected sequences of user interface element interactions).

Sequence/temporal information 128 is information that relates to how a particular user action 124 relates to other user actions. For example, if a user selects a first button, types text in a first field, selects a second button, and then selects a fourth button, the individual user actions 124 can be associated with sequence numbers of 1, 2, 3, and 4, respectively. This information can be useful in determining both what a user did, as well as what, perhaps, a user intended to do.

The sequence/temporal information 128 can also include information regarding how long a particular user action 124 took. For example, sequence/temporal information 128 can indicate that a user spent 40 seconds entering text in a text field before selecting a button. Sequence/temporal information 128 can indicate a time between actions, which may or may not represent a time that the user was interacting with the first user interface element. A user may select a button, an instantaneous action, and then it may take another period of time, say 15 seconds, before the user selects a menu item, button, text field, or other user interface element. The 15 second period may represent a period of time that the user was trying to determine the next action they needed to take, to find a user interface element, or some other issue that may be related to the design of the user interface, and which could be potentially be improved.

In a particular example, a time is recorded when a user interface element is first selected or activated. The sequence of user interface element interactions can be determined based on these timestamps. The pause between actions can be determined based on the time difference between successive actions. In some cases, at least a portion of this time can be associated with appropriate interaction with the user interface element—such as typing text into a field. In other cases, all or a portion of the time can be an indication of suboptimal user interface design. A delay may not necessarily be appropriate for sequential button selection, as no other input need be provided by a user between these actions. The only time needed would be the time to move a pointing device from the first user interface element to the second user interface element.

The training object 108 can optionally include one or both of labels and corrections 132. Labels 132 can identify a particular type associated with the user interface element associated with the actions 124. The type can be used to determine whether the sequence/temporal information 128 is appropriate. For example, a particular time, such as a 40 second delay, between activation of user interface elements may be appropriate if the first user interface element is a text box. The 40 second delay may not be appropriate if the first user interface is a simple radio button.

Corrections 132 can include indications of problems that were identified with an action 124, a general solution type to the problem (e.g., "increase button size," "move button"), a specific solution to the problem (e.g., "increase button size by 20 pixels," "display tool tip guidance"), or a specific implementation of a solution to the problem (e.g., code such as button.size*=1.2, or a particular repository object of an automated correction or a definition of a user interface element having the appropriate properties).

The training object 108 can be processed at 136 to provide formatted training data objects 140. Processing 136 can include formatting the application information 116, the user information 120, and the labels/corrections 132 for use in training the machine learning component 112. Among other actions, the processing 136 can including grouping, or classifying, the actions 124 into grouped actions 144. Grouping the actions 124 can be useful in defining ranges for sequence/temporal information 128 such that normal and outlier ranges can be defined for different types of user interface elements, different workflow types, or other desired groupings. In a particular example, groups can be defined such that user activities that are expected to take similar amount of time to complete are grouped together. Such grouping can be carried out, in some cases, without considering the nature of the user interface element involved (e.g., whether the user interface element is a button or text field) or without considering the workflow involved.

The formatted training objects 140 can be submitted to the machine learning component 112 in a process 148. The machine learning component 112 can thus be trained to provide a classifier 152, which, in particular cases, can use regression techniques to determine user activity outliers, which can indicate user interface design issues.

Figure 2:
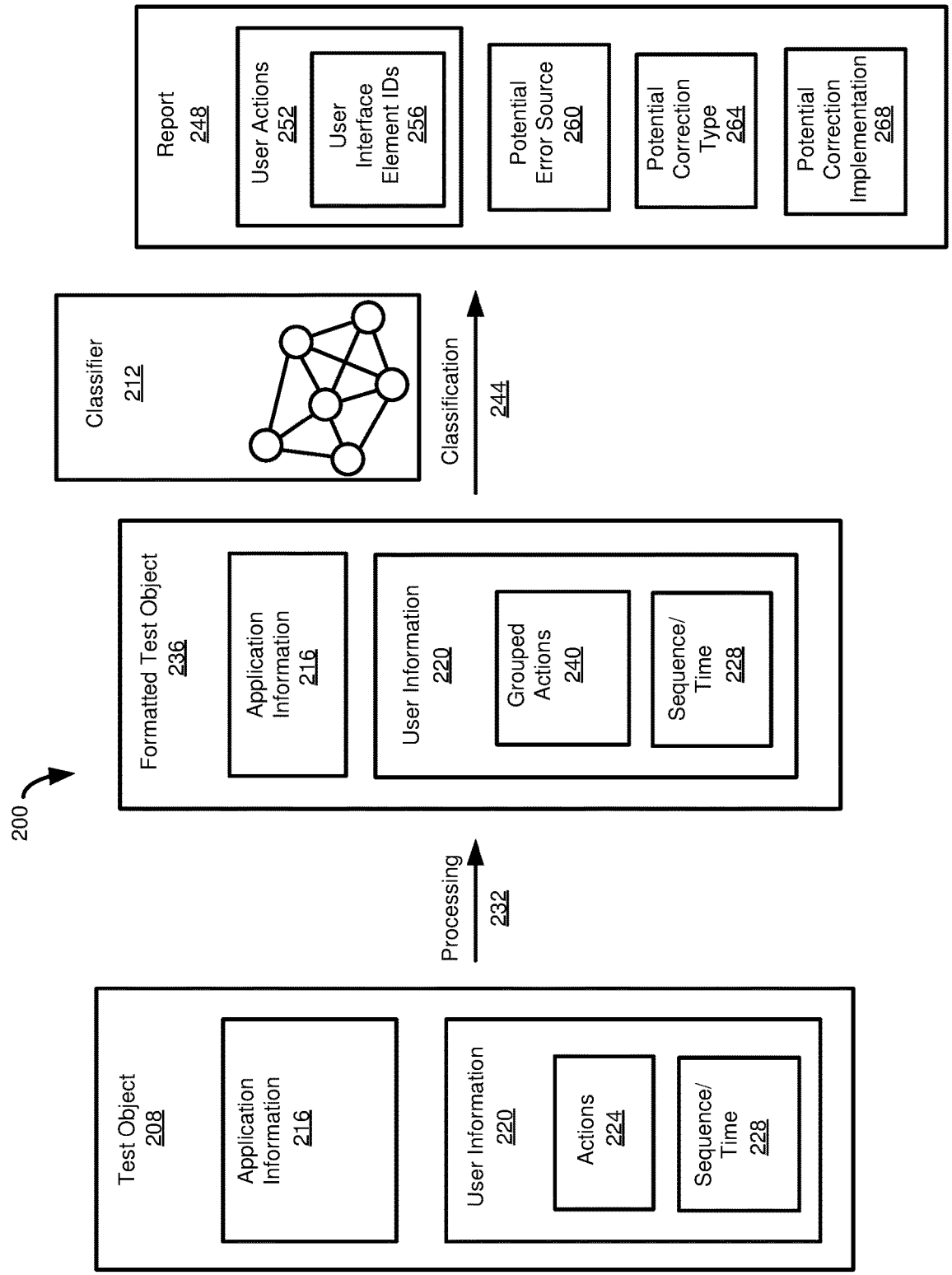
FIG. 2 is a schematic diagram illustrating how a trained machine learning component can be used to analyze test user data for potential user interface design issues.

FIG. 2 is a block diagram illustrating a scenario 200 of how disclosed technologies can use one or more test data objects 208 with a trained classifier 212, produced using the scenario 100 of FIG. 1, to determine the existence of potential user interface design issues. A test data object 208 can include application information 216 and user information 220, which can be analogous to the application information 116 and user information 120. Correspondingly, the user information 220 can include actions 224 and sequence/temporal information 228, analogous to the actions 124 and the sequence/temporal information 128.

The test object 208 can be processed at 232. The processing 232 can include grouping the actions 224, such as based on groups determined in the scenario 100. For example, if scenario 100 determined that "Button 1" was in Group 1, then data from "Button 1" would be assigned to Group 1 in the scenario 200. Or, if a text field having a "medium complexity" was assigned to Group 1 in the scenario 100, a different text field having a "medium complexity" could be assigned to Group 1 in the scenario 100. The processing 232 results in grouped action 240 in a formatted test object 236.

The formatted test data objects 236 are submitted to the trained classifier 212 in a process 244. The classifier 212 analyzes the use pattern represented in the formatted test data objects 236. One or more actions 252 are determined to be outside of a corresponding group 240 of the training data identified using the classifier 212. The classifier 212 provides a report 248 indicating the user actions 252 that are consider to lie outside a normal range. The report 248 can provide additional information, including the identifiers 256 of user interface elements associated with the user actions 252, one or more potential error sources 260, one or more general correction types 264, one or more correction implementations 268, and combinations thereof.

Example 3—Example Classifier Training

Although other types of machine learning techniques can be used, in a particular example, regression based techniques can be used to identify outlier events in user activity data. Suitable regression techniques include linear regression, logistic regression, polynomial regression, stepwise regression, ridge regression, lasso regression, and elasticNet regression. A training process, such as depicted in FIG. 1, can use training data that tracks user activity over time to provide a baseline to which test data can be compared. If the test data includes user interactions that are considered to be outliers (such as based on a duration of an interaction with a respective user interface element) compared with the baseline, a user interface issue can be indicated.

User activities can be grouped based on their time consumption. Groups can be defined having different time intervals, such as having a time of 0.01 seconds to 1 second, greater than 1 second to 5 seconds, and greater than 5 seconds to 5 minutes. The number of intervals and the interval definition may be varied as desired. In some cases, the intervals can be regular (e.g., having the same duration), while in other cases one or more of the intervals can be irregular. A threshold execution time can be defined for each group. Thus, user interface elements (at least a portion of user interface elements to be analyzed) are associated with threshold execution times through their assigned groups.

In particular cases, a user interface element is associated with a single group. In other cases, a user interface element can be associated with multiple groups. For example, a user interface element may be interacted with multiple times in a workflow, and the expected interaction time in a first workflow may be sufficiently different than the excepted interaction time in the second workflow that the user interface element is assigned to different groups for the different workflows.

Mathematically, the set of user interface activities (or interactions) can be represented as $\{A_1, A_2, A_3, \ldots A_n\}$, where an activity represents a user interface element, and possibly a particular interaction with a particular user interface element. The set of activity groups can be represented as $\{G_1, G_2, G_3, \ldots G_n\}$. Each group can include one or more activities. So, a group $G_n$ can have a set of activities $\{A_1, A_2, \ldots A_n\}$.

When test data is acquired, the test data includes one or more of the activities of the set of activities for the training data. Each activity $\{A_1, A_2, A_3, \ldots A_n\}$ is associated with a respective time $A_1T_C, A_2T_C, A_3T_C, \ldots A_nT_C$ taken to complete the activity. Each activity $\{A_1, A_2, A_3, \ldots A_n\}$ can also be associated with a respective time $T_1, T_2, T_3, \ldots T_n$, representing when the activity was carried out. The time taken to complete an activity can be defined as the difference between the time the activity occurred and time of the preceding activity, or $A_{n+1}T_C = A_{n+1}T - A_nT$. The initial activity $A_1$ can be assigned a time in another manner. For example, a time $T_0$ can be set, representing a time the user display was first presented to a user or another time chosen to act as a baseline for determining $A_1T_C$.

Each activity $\{A_1, A_2, A_3, \ldots A_n\}$ is mapped to its corresponding group $\{G_1, G_2, G_3, \ldots G_n\}$. The approximate time taken to complete an activity in the group can be represented as $G_1T_{approx}, G_2T_{approx}, G_3T_{approx}, \ldots G_nT_{approx}$. The approximate time to complete an activity in a group can be calculated in various ways, such as by using the average time taken to complete the activity as measured by the training data (where, for example, individual activity consumption times can be calculated as described above for $A_1T_C, A_2T_C, A_3T_C, \ldots A_nT_C$). However, the approximate time can be calculated in other ways, such as by using another statistical calculation based on training data consumption times.

A difference can be determined between the approximate group activity time and time consumed for a particular activity for test data. For example, for a test activity $A_1$ belonging to a group $G_1$, the difference, or check value, can be calculated as: $A_1C$ (the check value for activity 1)=$G_1T_{approx}$-$A_1T_C$. The check values for each activity in a group can be clustered. Activities having a distance greater than a threshold distance from the cluster (e.g., from a medoid or other cluster point or definition) can be designated as outliers. Outliers can be associated with potential user interface design issues, or at least a particular user who is having trouble navigating through a particular user interface design.

In some cases, a report of outliers can be provided. The report can provide an identifier of a user interface element associated with the outlier activity, information regarding why the activity was an outlier (such as a time by which the group activity value or some other threshold was exceeded), a potential cause of the outlier status (such as a button having a confusing label, etc.), a potential solution (such as by resizing a button), a potential solution implementation (e.g., code to correct the issue), or a combination thereof. In other cases, outlier behavior can be determined in real time. In such cases, steps can be taken to assist a user, such as by displaying tool tips or other information to guide a user to a next user interface element or to complete an interaction with a user interface element.

Figure 3:
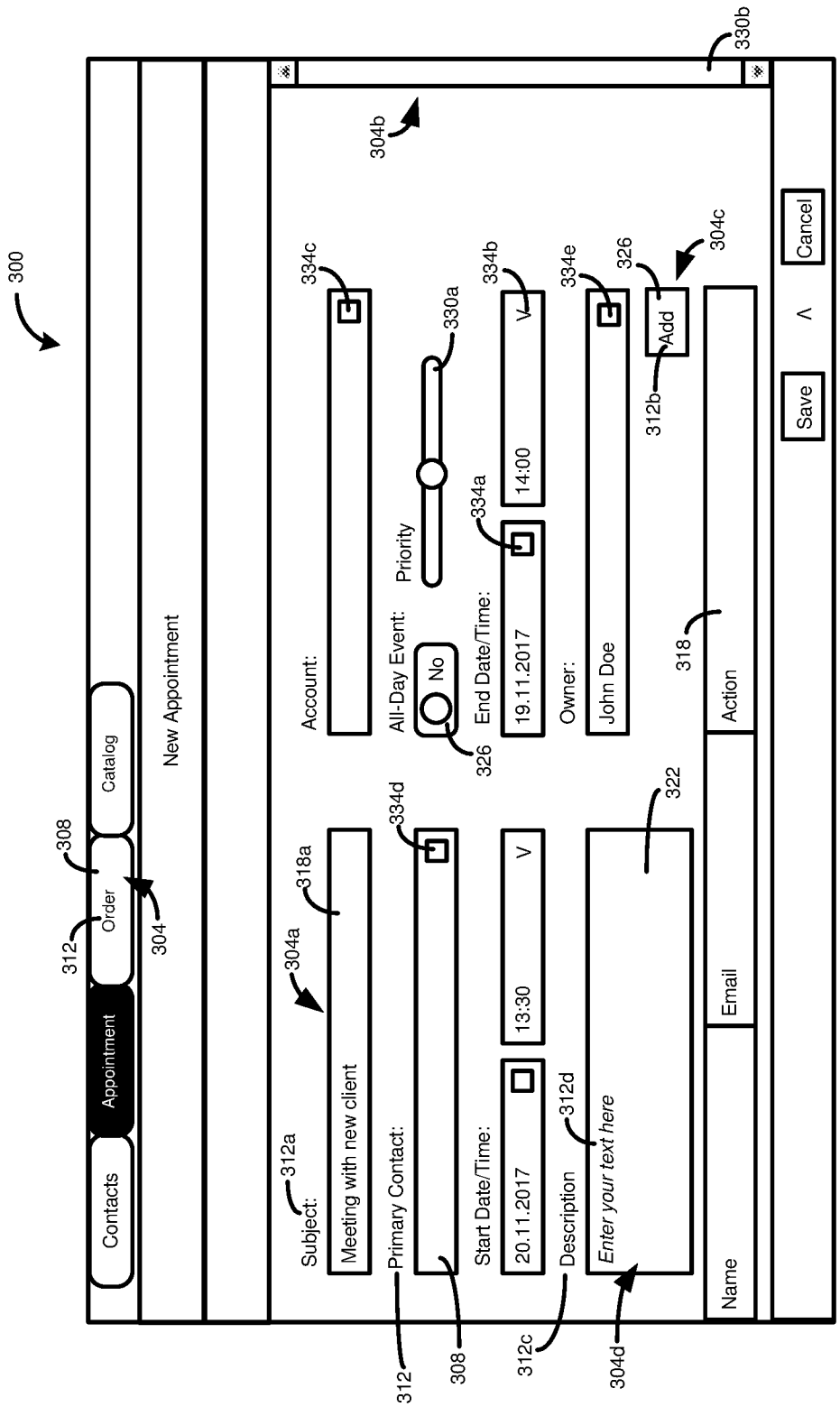
FIG. 3 is an example user interface screen, having a user interface design that includes a plurality of user interface elements.

Example 4—Example Analysis of User Data Using Trained Machine Learning Component FIG. 3 illustrates an example user interface screen 300. Although the disclosed technologies are not limited to any particular user interface, or even particular user interface elements, FIG. 3 incudes a plurality of user interface elements 304, all or a portion of which can be tracked and used to determine possible user interface design issues. Other user interface designs, and user interface element types, can be associated with tracking an analysis in an analogous manner as will be described for the screen 300.

The user interface elements 304 can include one or more control portions 308. The control portions 308 can be displayed elements that can be activated or edited by a user. For example, a control portion 308 can be a text box, text field, button, scroll bar, slider, etc. User interface elements 304 can optionally be associated with one or more labels 312. Labels 312 may or may not be selectable by a user, but typically provide context for a control portion. For example, user interface element 304a is a text field that is associated with the label 312a of "subject." Thus, the label 312a guides a user as to what input is expected in the text field.

In some cases, a user interface element 304 need not have a label 312. For example, the scroll bar element 304b does not have a label. The graphical representation of button element 304c includes text corresponding to a label 312b, but does not include a separate label. Text box element 304d incudes a label 312c next to the text box, and includes additional text, which can serve as a label 312d (e.g., additional text can be part of the text box element 304b, rather than being a separate label). In at least some cases, labels 312 can be specified code that is used in rending the corresponding user interface elements 304.

The user interface screen 300 can relate to a particular workflow. As illustrated, the workflow can relate to scheduling an appointment, such as an appointment with a client. The user interface elements 304 represent various components that can be used in setting various aspects of the appointment. The information regarding the appointment can be stored in a data object, such as an instance of an abstract or composite data type, or in a table, such as a relational database table.

The user interface screen 300 can include a plurality of text fields 318 and text boxes 322. For example, text field 318a can allow a user to type a note in the subject field, describing an appointment. Text box 322 can allow a user to enter additional information regarding an appointment.

The user interface screen 300 can include a plurality of buttons 326. Buttons 326 can allow a user to select between one or more options or values. For example, a button can be pressed to cause a particular action to be taken, such as to save an appointment. Other buttons 326 can correspond to binary switches indicating selected/not selected, or otherwise selecting between two values. Other buttons 326 can be activated to select between more than two values, such as a button representing days of the week, where successive selections cycle through the days.

The user interface screen 300 can include variable value controls 330, such as a slider 330a and a scroll bar 330b. The variable value controls 330 can allow a user to select a value within a, typically bounded, range.

A plurality of picker elements 334 can be included, including a date picker 334a, a time picker 334b, an account picker 334c, a contact picker 334d, and an owner picker 334e. In some cases, such as the date picker 334a and the time picker 334b, selection of the picker element can cause standard selection functionality to be called. A file picker can be implemented in a similar manner, where selecting the file picker causes a file browser functionality to be implemented. In other cases, a picker element 334 can be linked to specific menu choices for the picker element, which can be set options, or options that are drawn from a data source, such as a database (e.g., from a list of contacts associated with a particular user or account).

Typically, a user interface screen will be designed to facilitate a particular task that is designed to be carried out using the screen. For example, the user interface elements are typically arranged on the screen, including their location on the screen, location relative to other user interface elements, size, color, etc., to guide a user through a workflow. That is, rather than being displayed in a haphazard manner, the user interface elements are placed to guide a user through a task, corresponding with the user's mental process in accomplishing the task.

Taking the screen 300 as an example, it might be expected that a user would first want to enter a subject for an appointment, then enter a contact for the appointment, and then enter information regarding the time and location of the event. However, different users may think about a task in a different way. In addition, different users may more intuitively associate some terms with task components than other terms. Thus, a user interface designed for one user may not be as suitable for another user. Differences in language, nationality, technical expertise, job function, and similar criteria can result in certain user interface designs being very good for some users, but poor for others. In particular, a user interface designer may think about a task very differently from an end user. Changes to particular user interface elements, such as sizes, placements, labels, etc., can thus make a user interface more or less usable for various groups of users.

At least a portion of user interface elements of a user interface can be associated with tracking elements. A tracking element can cause an entry to be generated, such as in a log, that can include information that can be used to evaluate the effectiveness or performance of a user interface design. Tracking elements can be implemented in different ways in order to generate a "click stream." In a particular example, code defining a user interface element can be configured to cause a log entry to be written when the user interface element is selected or interacted with. For example, code implementing actions to be taken on a button selection (e.g., triggered in response to an event listener) can include functionality to change a variable, but also code to write a log entry. The tracking functionality can be selectively activatable, at least in some aspects. For example, the tracking functionality may only execute if a flag is set to true (e.g., "If Reporting Flag==True, WriteLogEntry (controlId, time, date)").

The log entries produced by the tracking elements can help determine if a user interface is functioning efficiently, in general, or for a particular user. In some cases, based on an analysis of the log entries, such as using a classifier based on a machine learning technique, it can be determined that one or more elements of the user interface should be altered. For example, it could be that a text label is non-intuitive. In the example of FIG. 3, it could be that the label 312c, "Description," for the text box 322 is not sufficiently descriptive, and that users pause for a significant amount of time before entering text in the text box. The tracking information can reveal this delay, and the developer can potentially resolve the problem by using a different label 312. Issues related to user interface element size and position can be identified and altered in a similar manner.

In other cases, it can be determined that a particular user is having an unexpected problem with the user interface. It may be that the user interface is well suited to the vast majority of users, but a particular user, for whatever reason, is having difficulty navigating the user interface. In some aspects, user behavior can be monitored, such as in real time. If a delay exceeds a threshold, or is otherwise identified as unusual, steps can be taken to assist the user. For example, tool tips can be presented to the user to guide the user to a next user interface element or to explain the meaning of a user interface element.

The disclosed technologies are not limited to any particular user interface or user interface elements. General categories of user interface elements that can be used with the disclosed technologies include input controls, navigational controls, informational elements, and containers. Input controls can include user interface elements such as check boxes, radio buttons, list boxes, drop down lists, buttons, dropdown buttons, text fields, text boxes, toggles, and pickers, such as date pickers, time pickers, file browsers, and the like. Navigational controls can include user interface elements such as breadcrumbs, search fields, tags, pagination elements, icons, sliders, or image carousels. Information elements can include progress bars, notifications, tool tips, message boxes, and pop ups. Containers can include accordion elements.

User interface elements can be associated with different types of user interactions. In at least some aspects, a single user interface element can be associated with a plurality of user interaction types. In other aspects, a user interface element can be associated with a single user interaction type. User interaction types can include button presses, changes, and live changes. Button presses can represent a selection or activation of a user interface element. A change event can represent a change in a value, such as a slider, text field, or text box that is formally set by a user. Being formally set by a user can include a user hitting an enter key or taking similar action to indicate that their input is complete, at least for a present interaction (e.g., the user may change the value later). Being formally set can also include user activity making the user interface element go out of focus. For example, if a user enters text in a first text field, and then clicks in a second text field, the activity in the first text field can be recorded as a change.

Live changes can represent a continuous or potentially transitory interaction with a user interface element. For example, typing or copying or pasting text into a text box or text field can be recorded as a live change. Similarly, user activity changing the value of a slider or a scroll bar can be recorded as a live change. Live changes, in at least some cases, can precede change events. That is, for example, a user typing in a text field can be recorded as a series of live changes (in some cases, a live change can be recorded for each key stroke). Once the user hits enter, or the user interface element goes out of focus, a change event for the user interface element can be recorded.

Example 5—Example Computing Environment

Figure 4:
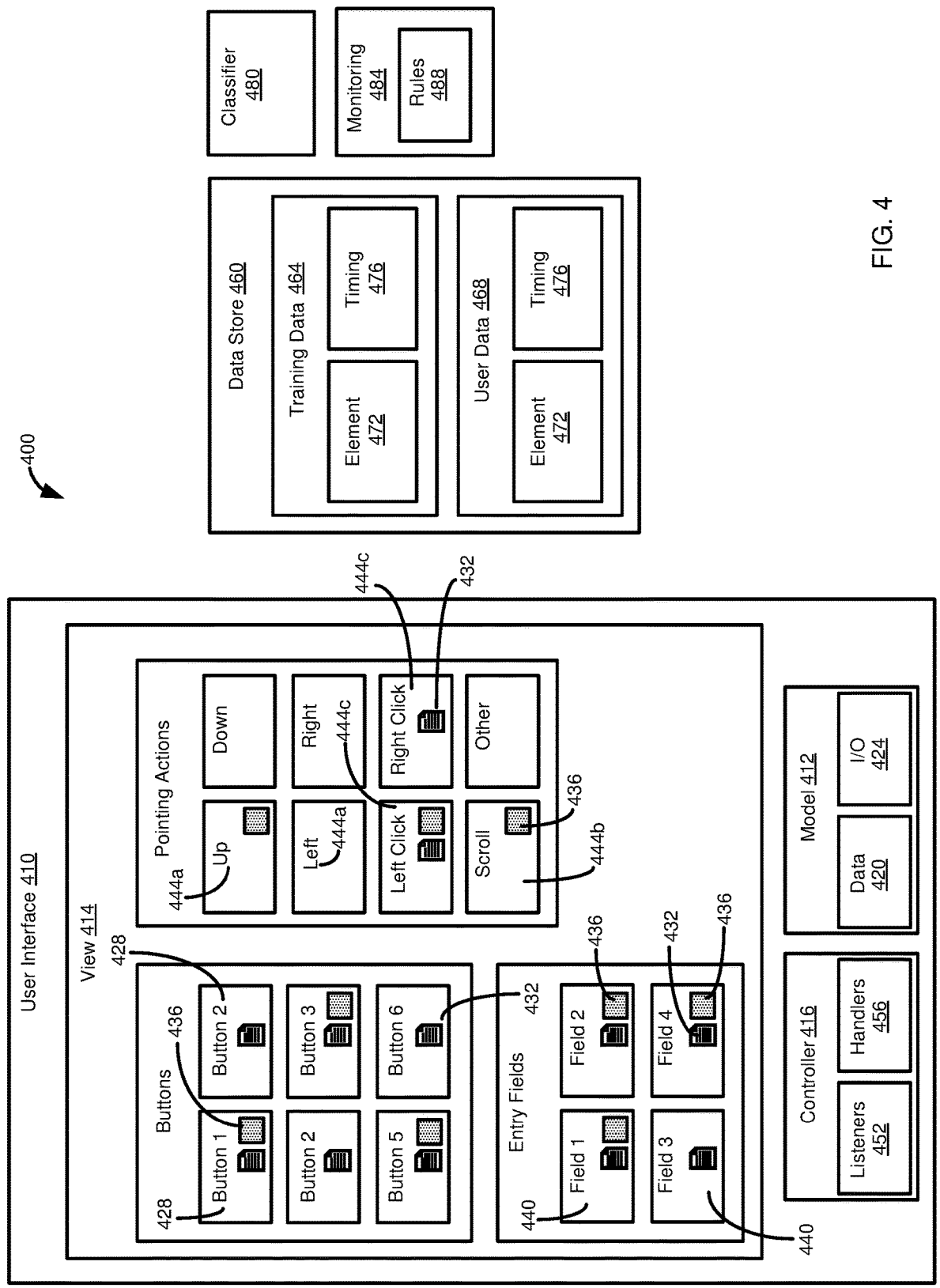
FIG. 4 is a block diagram of an example computing environment having a model-view-controller architecture in which disclosed technologies can be implemented.

FIG. 4 illustrates an example computing environment 400 in which disclosed technologies can be implemented. The computing environment 400 includes a user interface 410. The user interface 410 can be based on a model-view-controller design, including a model 412, a view 414, and a controller 416.

The model 412 can include data that is to be rendered by the view 414, and with which a user can interact using the controller 416. The model 412 can include data 420. The data 420 can represent, for example, data from a database, and can include data entered by a user. The model 412 can include an input/output component 424 that can retrieve and store data 420. For example, in response to input received through the controller 416, the input/output component 424 can retrieve data 420 associated with a selected file. The data 420 can then be rendered for display in accordance with the view 414.

The view 414 can define how data 420 in the model 412 should be rendered. The view 414 can also define functionality for causing actions to be taken regarding the data 420. The view 414 can define various user interface elements, including user interface elements that can be associated with tracking functionality. The user interface elements can include one or more buttons 428. The buttons 428 can be associated with metadata 432. The metadata 432 can define aspects of how the buttons 428 are displayed, such as including a text label to be displayed on or proximate the button. The metadata 432 can define a type or category for the button 428, and may specify display properties of the button, such as a size, color, location, etc.

One or more of the buttons 428 can be associated with a label or tag 436 that can be associated with tracking information. The label or tag 436 can include an identifier of the button 428, and context information associated with the button, such as a workflow with which the button is identified, or a user interface identifier for the user view 414 (e.g., a particular page, view, or screen of the user interface 410). However, the label or tag 436 can include more, less, or different information. For example, the label or tag 436 can simply indicate that a user interface element was activated, along with sequence information, which can be one or both of an identifier of an order in which the user interface element was activated and a time at which the user interface element was activated or interacted with.

The view 414 can include other types of user interface elements, such as entry fields (e.g., text fields or text boxes)

440. As with the buttons 428, the entry fields 440 can include metadata 432, which may be similar to the metadata of the buttons. At least a portion of the entry fields 440 can include labels or tags 436, which can be similar to the labels or tags of the buttons 428.

Pointing actions 444 are another type of user interface element that can be included in the view 414. Pointing actions 444 can include actions 444a that move a cursor, or pointer, in various directions. Pointing actions 444 can also include scrolling actions 444b and selection actions 444c, such as "right click" or "left click" actions. One or more of the pointing actions 444 can include one or both of metadata 432 and labels or tags 436, which can be similar to the metadata 432 and the labels or tags 436 of the buttons 428. However, in at least some cases, the metadata 432 or tags 436 can include different information than the metadata or labels or tags 436 of the buttons 428.

That is, in at least some cases, pointing actions 444 can be comparatively generic user interface elements, rather than being specific to a particular user interface 410 (e.g., a button 428 may relate to a specific action for a specific user interface, whereas pointing interactions are a generic interaction for a computing device—there is no special significance to "up" in one user interface versus another). However, pointing actions 444 can still provide information about a specific user interface 410. For example, the position of a cursor on a display, or the type of pointing actions 444 being made by a user, can indicate whether a user is "looking" for a user interface element in a particular area of the screen, or can indicate a possible source of confusion of the user (e.g., periods of time between the selection of buttons 428 or other user interface elements may be associated with different design issues depending on whether the user is taking no action at all during the time period or is engaging in pointing actions 444).

In some aspects, pointing actions 444 and other user interface elements can be combined to provide user interaction information. For example, a user interface 410 may have specific menu options that are brought up on a "right click," and which are then selected using a "left click." Or, a user interface element, such as a menu or a button 428, is selected based on user pointing actions 444 (e.g., the user "left clicks" on a button). Distinguishing how a user activated a user interface element, such as a button 428 or a menu item, such as by a pointing action 444 versus a keyboard shortcut, can be useful, in some circumstances.

Although the view 414 is shown with particular types of user interface elements (e.g., buttons 428, entry fields 400), it should be appreciated that the view can include more, fewer, or different types of user interface elements than shown in FIG. 4, and different numbers of such user interface elements. All or a portion of any particular type of user interface element can be associated with one or both of the metadata 432 and labels or tags 436. In addition, although FIG. 4 illustrates a model-view-controller design, tracking functionality, which can include the use of the metadata 432 or tags 436, can be used with other types of user interface implementations.

The controller 416 can include listeners (e.g., event listeners) 452 and handlers (e.g., event handlers) 456. Listeners 452 can determine when a particular user interface element, such as an element of the view 414, is triggered or activated by a user. The handlers 456 can define actions that are taken when a listener 452 determines that a particular user interface element has been activated. In particular aspects, tracking functionality can be incorporated into the handlers 456 (or, in some cases, into the listeners). For example, although shown as part of the view 414, the metadata 432 or tags 436 can be implemented in the controller 416, such as in the handlers 456.

The computing environment 400 can include a data store 460. The data store 460 can store training data 464 and use, or test, data 468. The training data 464 and user data 468 can include element information 472 and timing information 476. The element information 472 can include information regarding particular user interface elements that were activated, while the timing information 476 describes when, or in what sequence, the user interface elements were activated. The training data 464 can include other information, such as an indication as to the source of a problem, an indication of a solution type, a solution implementation, or a combination thereof.

The training data 464 can be used to establish user interactions, and interaction patterns, that are "normal," or indicative of acceptable user interface design, and interactions, and interaction patterns, that are "abnormal," or indicative of user interface design issues, or that a particular user is having issues with a particular user interface. The training data 464 can be used to train a classifier 480. The user data 468 can be submitted to the classifier 480, and abnormal interactions can be identified. Optionally, the classifier 480 can also provide information regarding potential sources of user interface design issues, potential solutions to such issues, potential solution implementations, or combinations thereof.

The computing environment 400 can include a monitoring component 484 that uses rules 488 to determine whether a user is having issues with a particular user interface. For example, if the classifier 480 determines that user data 468, such as real time user data, is out of range, the monitoring component 484 can determined by the rules 488 whether any action should be taken and can implement such action, or cause such action to be implemented. For instance, the monitoring component 484 can cause the view 414 to display tool tips or other types of information to guide a user in completing a workflow associated with the user interface 410.

Example 5—Example User Interface Records

FIG. 5 illustrates a table 500 that can represent a log produced by monitoring user activities, such as monitoring occurring in conjunction with the computing environment 400 of FIG. 4. The table 500 can include a plurality of entries 504. The entries 504 can include information regarding particular user interactions with particular user interface elements of a particular user interface, including particular screens, pages, or views.

As shown, each entry 504 includes a user identifier 508. The user identifier 508 can be, for example, an alphabetical, numeric, or alphanumeric identifier of a particular user. The user identifier 508 can be a name of a user, or otherwise used to distinguish individual users. In some cases, the identity of a user does not matter, other than to distinguish one series of user interface interactions from another series of user interface interactions. In other cases, the identity of a user can be used for other purposes, such as to facilitate intervention when a particular user is determined to be having difficulty with a particular user interface.

The entries 504 can include information that identifies a particular context for a user interaction. The context can include an application name, or identifier, 512, and a page, view, or screen name, or identifier, 516. The identifiers 512, 516 can facilitate training of a machine learning technique or the use of a trained classifier. For example, the identifiers 512, 516 can help ensure that training data is more accurate, in that different applications, and even different screens of the same application, can have different functions, different user interface elements, or different displays of user interface elements. Accordingly, one particular screen may not be comparable with other screens. Or, screens that are sufficiently similar, in some cases, can be grouped for comparison purposes, where the identifiers 512, 516 can be used in defining groups and determining group membership. The identifiers 512, 516 can also be used for reporting purposes, such as to guide a developer to which application, or screen thereof, may be associated with design issues.

The entries 504 can include an identifier 520 of a particular user interface element or a particular interaction type (e.g., cursor movement, cursor selection, typing, swipe, pinch and zoom, etc.). In some cases, the identifier 520 can be used to help determine whether a particular user interface interaction sequence is abnormal, or to establish a baseline of normal interaction. For example, the identifiers 520 can facilitate comparisons between different user interaction sequences, where a user may choose to interact with user interface elements in different orders. The identifiers 520 can also be used to help guide a developer to particular user interface elements that may be a source of a user interface design issue, or used in correlating particular user interface elements to particular problem types, general solution types, solution implementations, or combinations thereof.

The entries 504 can include an event type 524. The event type 524 can be a particular category of user interaction, such as input, navigation, information, etc. The event type 524 can represent other types of information, such as whether the user input was a button press, a pointing device action, a text entry, etc. As shown in FIG. 5, the event types 524 include button presses 524*a*, changes 524*b*, and liveChanges 524*c*. LiveChanges 524*c* can represent variable input or potentially transient input, such as user typing actions, where a user may add text or remove text before completing an entry. LiveChanges 524*c* can also represent interactions with user interface elements such as a slider bar.

Changes 524*b* can represent final, or at least temporarily final (e.g., the user can return to a field and change a previously entered value), user actions. A user typing text into a text box, for instance, may initially be a liveChange 524*c*. If a user presses the enter key, or the user interface elements goes out of focus (e.g., the user selects a different user interface element), the interaction can be recorded as a change event 524*b*.

Each entry 504 can be associated with one or more times 528. The times 528 can be used for at least two purposes. The times 528 can be used to establish an order or sequence in which user interface elements were activated. The order can be used, among other things, to define a workflow or to determine if particular user interactions are out of sequence compared with a baseline.

The times 528 can also be used to establish a time that can be correlated with how long a user takes to complete an action. As an example, event 504*a* is shown with a time of 11:11:30, while the preceding event 504*b* is shown time with a time of 11:11:23. The difference between these times, 7 seconds, can represent a period of time taken by a user to determine a next action to take and to activate the appropriate user interface element. Event 504*a* can represent a user typing in a text box or text field, while event 504*c* can represent the user pressing the enter key or the text box or text field going out of focus. The time taken to complete the text entry, 42 seconds, can provide an indication of whether the user understood the information that was required to be entered.

User interaction durations or delays determined from the times 528 can be used for a variety of purposes. For example, the 7 seconds taken to move from event 504*b* to 504*a* can be compared with a threshold or range. If a normal time to move to a text box is less than 10 seconds, then the event sequence of table 500 can be determined to be normal or acceptable. On the other hand, if the normal time taken to move to a text box is less than 5 seconds, then the 7 second time can indicate the presence of a user interface design issue. That is, it may be possible to reduce the interaction time by providing a more understandable label for the text box, making the text box larger, moving the text box to another location, highlighting the text box, etc.

The interaction durations or delays determined from the times 528 can also be used to determine whether a particular user is having unexpected issues with a user interface design. Events 504*d*, 504*e* represent the same interaction sequence as events 504*a*, 504*b*. However, while user 1 completed the transition in 7 seconds, user 2 took over two minutes. While user 1 took 42 seconds to complete the text entry, user 2 took over 2 minutes. In some cases, user 2's interaction times may indicate a problem with the user interface design. In other cases, user 2's interaction times may indicate that user 2, for whatever reason, is having difficulty with the user interface. Rather than indicating that a design change should be made, user 2's interaction pattern may indicate that user 2 should be provided with assistance, such as in the form of tool tips, for navigating the user interface.

Determining whether user interactions taking an expectedly long time are indicative of a problem with a user interface design, or are issues with the user, can be performed in various ways. In some cases, a user interface can undergo an evaluation period where delays are used to refine the user interface. After the user interface is sufficiently evaluated, and the design is set, when a user has unexpected delays in activating user interface elements, the delays can be ascribed to user error and assistance can be provided to the user rather than flagging the issue for redesign.

In other cases, a number of users having delayed interactions can be tracked. When the number exceeds a threshold (such as a percentage of users over a particular time period), an alert can be generated that the user interface may need redesign. That is, if a sufficient number of users have issues with the user interface, it can indicate that the source of the problem is with the user interface, not with the user. Distinguishing between issues related to individual users and issues related to user interface can design can be important. Otherwise, for example, redesigning an interface for an outlier user may reduce usability for typical users, thus overall degrading the user interface, not improving it.

Example 7—Example Training Data Object

Figure 6:
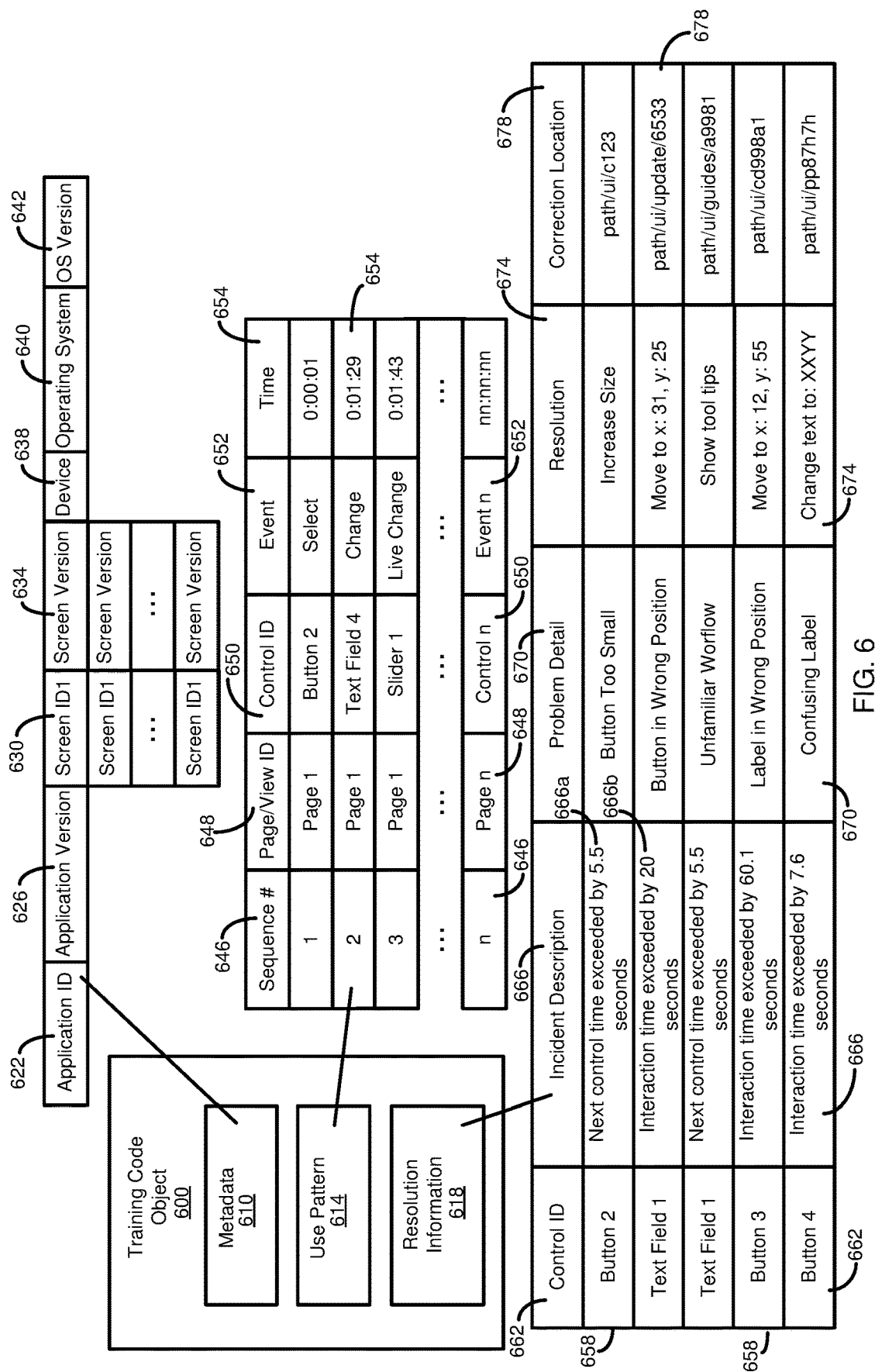
FIG. 6 is a diagram illustrating elements of a training data object.

FIG. 6 illustrates an example of a training data object 600. The training data object 600 can be, or can employ, one or more data types, such as abstract or composite data types. The training data object 600 can be, or can employ, one or more other data structures or types of stored data, such as relational database tables.

The training data object 600 can include metadata 610, use pattern information 614 (which can be, or based on, user information, such as the user information 120 of FIG. 1 or the user information 220 of FIG. 2), and, optionally, resolution information 618. The metadata 610 can include information that provides context for the use pattern information 614 and the resolution information 618. The metadata 610 can include an application identifier 622, which can be a name or other identifier for a software application that is associated with a particular user interface that is being monitored or evaluated.

Optionally, the metadata 610 can include an application version identifier 626. The application version identifier 626 can be used to identify a particular version of an application. For instance, different releases, including releases for different operating systems or platforms, can have different user interfaces. The use of the identifiers 622, 626 can be useful in training a machine learning algorithm and in providing more accurate classification or evaluation results using a trained machine learning algorithm.

The metadata 610 can include other information that can be used to help organize training data. The metadata 610 can include a screen identifier 630 and a screen version identifier 634. A particular application can have a variety of screens to facilitate a user accomplishing various tasks. While there may be some common user interface elements, such as a tool bar, between screens, at least some user interface elements, and in some cases most or all of the user interface elements, differ between screens. Thus, the screen identifier 630 and screen version identifier 634 can help ensure that training data from different users or different interaction sessions is more directly comparable or more accurately weighted.

Metadata 610 can include one or more device identifiers 638, an operating system identifier 640, or an operating system version identifier 642. Information regarding a device, operating system, and operating system version can also be useful in organizing training data so that a machine learning algorithm can be trained to provide more accurate results. For example, user interactions on a touchscreen of a tablet or smartphone may be different than interactions made using a desktop computer or a laptop computer. Some interaction modalities, such as swiping and pinching, may not available on some devices or operating systems, but available on others. Similarly, screens may be formatted differently depending on the device, operating system, or operating system version being used.

The use pattern information 614 can be actual or controlled information regarding user interaction with a user interface, such as user pointing actions and activation or use of user interface elements. The use pattern information 614 typically provides at least an indication that a user interface element was activated, and a time associated with such activation, but can include additional information.

As shown in FIG. 6, the use pattern information 614 includes a sequence number 646. The sequence number 646 can indicate a relative order in which a user interface element was activated. In some cases, the sequence number 646 can be omitted, and a sequence number can be derived from other information, or an analysis does not consider an order in which user interface elements were activated. The use pattern information 614 can include a page/view/screen identifier 648, a user interface element identifier 650, an event type identifier 652, and a time 654, which can be similar to the corresponding elements of FIG. 5, 516, 520, 524, 528, respectively.

The resolution information 616 can include entries 658 that can have information that can provide a developer or other user with one or more of a potential cause of a user interface design issue, a potential solution type, and a possible solution implementation to address the issue. The entries 658 can include a user interface element identifier 662. The user interface element identifier 662 can correspond to the user interface element identifier 650. The user interface element identifier 662 can alert the developer as to the particular user interface element for which a potential problem, or potential solution, is suggested.

The entries 658 can include an incident, or problem, description 666. The incident description 666 can provide an indication of why the particular user interface element identifier 662 was flagged as potentially having a design issue. For example, as with description 666*a*, the description can indicate by how much a threshold was exceeded in moving to a next control element. Description 666*b* provides an indication of how much longer a user interacted with a user interface element than expected. For example, it may have taken longer for the user to complete a text field or text box entry than expected. In at least some cases, a particular user interface element may be associated with multiple entries. For example, it may be that a user took longer than expected to start interacting with a particular user interface element, and, once they did start, it took them longer than expected to complete the interaction.

Problem descriptions 670 can convey a particular reason that an incident 666 occurred. Problem descriptions 670 can have information such as a button being too small, in the wrong location, having a mispositioned label, or having an insufficiently descriptive or understandable label. During an initial training phase, the problem descriptions 670, and in at least some cases the incident descriptions 666, can be information manually entered by a developer, or provided using another method. After an initial training period, the problem descriptions 670, and optionally the incident descriptions 666, can be provided as part of analyzing test data. For example, a user can confirm or adjust a classification, and this data can be used as additional training data to refine a machine learning model.

The entries 658 can include resolution, or solution, information 674. The resolution information 674 can provide a solution to resolve the issue indicated in a corresponding problem description 670. The resolution information 674, in some cases, can be comparatively general, such as to increase the size of a button, change a label, reposition a label, or reposition a user interface element. In other cases, the resolution information 674 can be more specific or detailed. For example, the resolution information 674 may suggest a specific size, location, or label for the user interface element. As with the incident description 666 and the problem description 670, at least initially, the resolution information 674 can correspond to information manually determined by a developer or using other techniques. Eventually, test data evaluation can be used as additional training data.

Resolution implementations 678 can be provided in the entries 658. As shown, the resolution implementations 678 provide a path location, such as a file path or a URI, which contains a solution. The solution can be in the form of a class, repository object, or code fragment that implements a solution. The solution can be an executable that modifies existing code, or it can be an independent object or code that can be used to replace an existing object or code.

However, other types of resolution implementations 678 may be used. For example, the resolution implementation 678 can be example code or code fragments for implementing the resolution information. The resolution implementation 678 can initially be provided manually by a developer, or by another method. After an initial training period, resolution implementations 678 can be provided by a disclosed technique, and can serve as additional training data.

Example 8—Example Test Data Object

Figure 7:
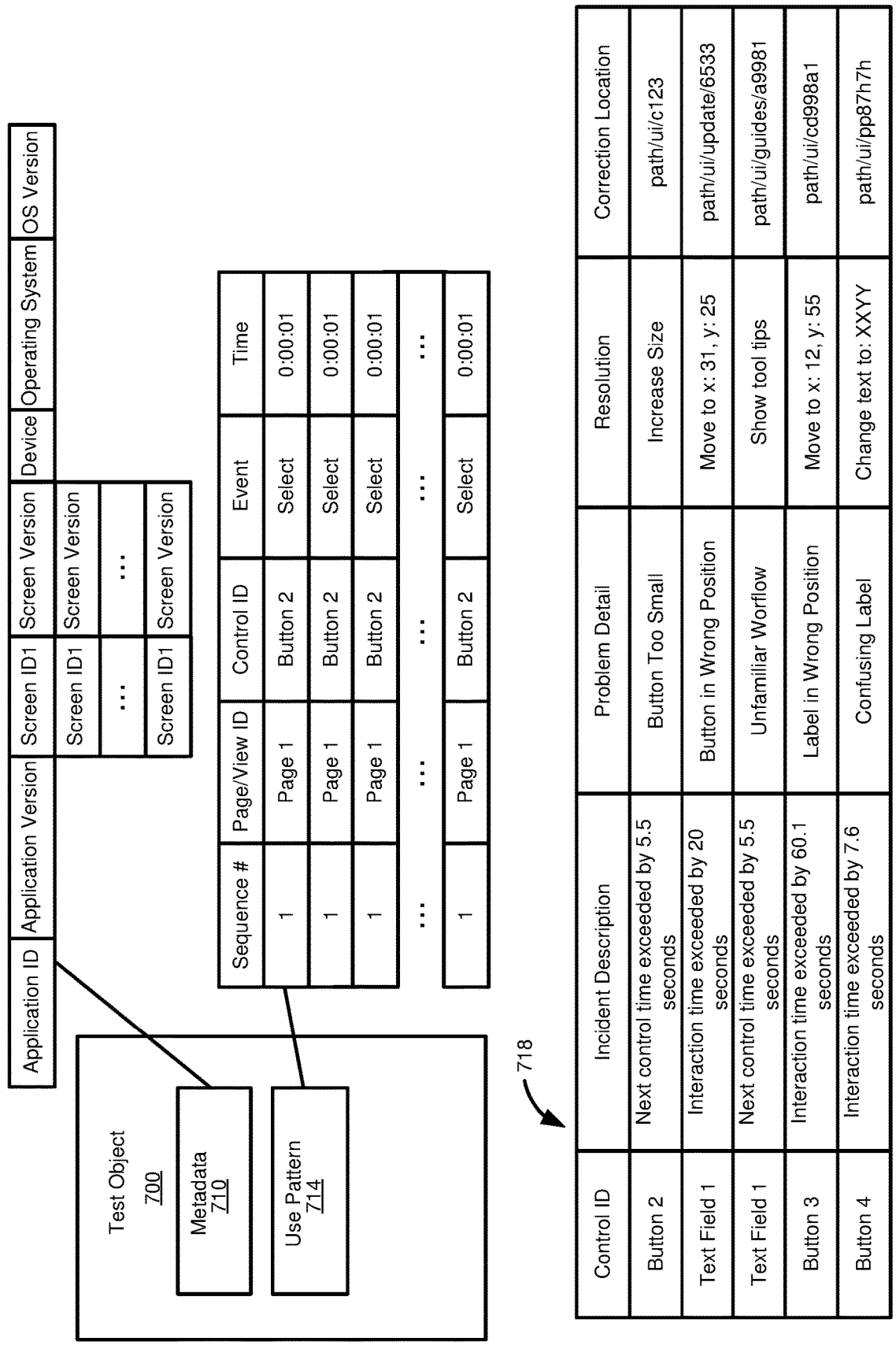
FIG. 7 is a diagram illustrating elements of a test data object.

FIG. 7 illustrates an example test object 700. The test object 700 can be submitted to a machine learning method, such as a classifier, trained using the training objects 600 of FIG. 6. The test object 700 can include metadata 710 and use pattern information 714. The metadata 710 and the use pattern information 714 can be implemented as described for the metadata 610 and the use pattern information 614, and so will not be further detailed.

Analysis of test object 700 using a machine learning technique, such as a trained classifier, can be used to generate a report 718. The report 718 can include, or be similar to, all or a portion of the resolution information 618, and so will not be further described.

Example 9—Example User Activity Log Entries

FIGS. 5-7 illustrate various types of information, including metadata 610, 710 and use pattern information 614, 714, in a structured form. However, in at least some cases, such information can be captured and processed in an unstructured or semi-structured format. In particular examples, the information can be captured and processed, for use as training data or test data, in XML or JSON format. Unless specified otherwise, semi-structured and unstructured data can be referred to as "records." That is, "records" is not meant to imply elements (e.g., rows) of a relational database. Relational database records can be specified as such by terms such as "database record," "row," "tuple," "database record," "table record," or similar term.

FIG. 8 illustrates example JSON objects 800 that include metadata 808 and use pattern information 812. The metadata 808 can include an event identifier 816, which can be a unique identifier assigned to a particular user interaction event. A controller identifier 820 can be included in a JSON object 800 to identify a particular user interface element for which tracking information has been recorded or logged.

The JSON objects 800 can include a timestamp 824, indicating when the user activity with the controller identifier 820 was recorded. As has been described, the timestamp 824 can be used for various purposes, including determining a sequence of user interactions with user interface elements, for determining a time taken between interacting with user interface elements, or for determining a time taken to interact with a user interface element.

An event type 828 can be included in the JSON objects 800. The event type 828 can represent a particular class of user interface element, or a particular class or type of user interaction with a user interface element. For example, an event type 828 can be indicated as a "button press," a "change" (which can be a final entry of a value in a text field, text box, or other type of final, user-supplied value), or a "live change" (which can represent user input events preceding a "change," such as each keystroke being recorded as a "live change" and a final entry, indicated using the enter key or switching to a different user interface element, indicated as a "change"). In some cases, the event type 828 can be used to help categorize user interactions, or to process user interactions. For instance, a time difference between a first "live change" event for a user interface element and a "change" event for the user interface element can be determined and associated with a particular user interface element, in addition to, or in place of, considering the "live change" events and the "change" event individually.

The JSON objects 800 can include a page, view, or screen identifier 832 that can specify which aspect of a user interface an activated user interface elements relates to. As has been described, such information can be useful in both training a machine learning technique and in using the technique to evaluate test data. However, in at least some cases, exact identity between user interface screens or user interfaces is not required. That is, user interface information for a first user interface can be used to evaluate user interactions with a second, different, user interface.

A machine learning technique can use interface identifiers, including the screen identifiers 832, to determine how training data should be organized/compared/evaluated and how test data relates to training data. For example, it may be known that two applications, a first, training, application and a second, test application, generally have similar user interface designs or interaction patterns, and thus training data for first and second applications may be more relevant than comparing the first application with a third application that is known to be relatively unrelated to the first application. Or it could be that two user interface elements have the same controls, but different presentations (e.g., an updated version of a form or other UI display). An application identifier 836 can be included in the JSON objects to facilitate such comparisons.

In at least some cases, different kinds of structured, semi-structured, and unstructured data can be used in a common technique. That is, data in any format can serve as training data or test data. Similarly data in a particular category can be formatted or composed in a different manner and used with the disclosed technique, such as semi-structured data in JSON or XML formats, or JSON formats having different elements, identifies, data formats, etc. A machine learning technique can, for example, parse relevant information out of data provided in any format.

Example 10—Example Controller and View

FIG. 9 illustrates code (in the SAP UI5 programming language) 900 for at least a portion of an example controller (e.g., in a model-view-controller design) that can provide for user input, or clickstream, capturing, which can be used for training data or test data. For example, the code 900 can implement at least a portion of the controller 416 of the computing environment 400 of FIG. 4.

Code elements 910 specify that tracking information is to be generated when a listener is triggered for a live change, a change, or a submission (e.g., a button press). In each case, the AppendEvent function 920 is called, which creates a log entry that includes a controller identifier, a timestamp, an event identifier, an identifier of a screen or page associated with an activated user interface element, and an application identifier that includes the screen or page.

FIG. 10 illustrates code 1000 for a view that can use the controller 900 of FIG. 9. The view defines various user interface elements 1010, which can include identifiers 1014 that are captured when a listener of the controller 900 is triggered. The user interface elements 1014 can be associated with a class designation 1018 that indicates that the elements are associated with user tracking.

Example 11—Example Analysis Scenario

Figures 11, 12:
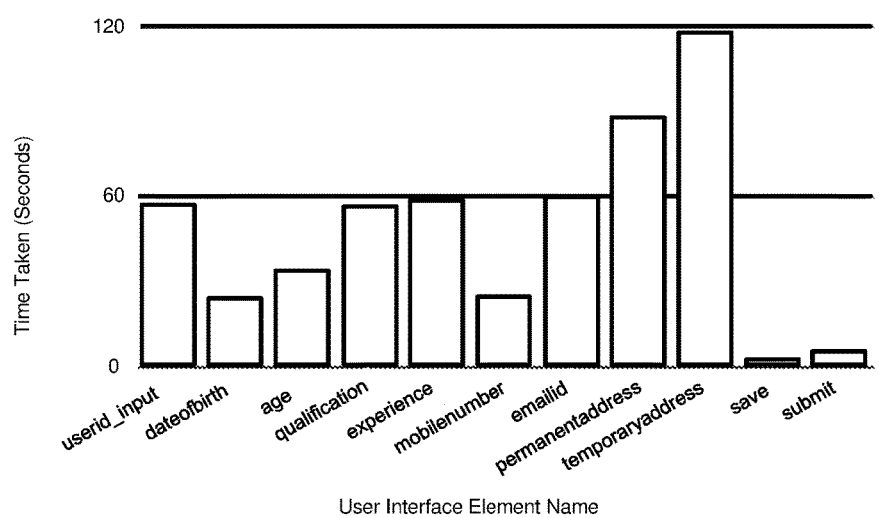
FIG. 11 is an example user interface screen used in an example scenario of how disclosed technologies can be used to identify user interface design issues.
FIG. 12 is a graph of times taken for a user to interact with user interface elements of the user interface screen of FIG. 11.

An example scenario of how disclosed technologies can be used to identify user interface issues is presented in conjunction with FIGS. 11-15. FIG. 11 presents an example user interface screen 1100 having a plurality of user interface elements 1110. The user interface elements 1110 include text fields 1110*a* and buttons 1110*b*.

User activity with the screen 1100 may be tracked over a period of time in order to obtain training data. The information can include the identity of the user interface elements 1110 and when (e.g., via a timestamp) a user interface element was activated. Based on timestamp differences between successively activated user interface elements 1110, an interaction time can be determined for a user interface element.

FIG. 12 illustrates a graph of time taken (seconds) for various user interface elements. It can be seen that text fields 1110a have longer interaction times than buttons 1110b, although the time taken to interact with a text field can vary significantly. Note that, in the case of text fields 1110a, the time taken can represent multiple user actions. For example, each character entered in a text field 1110a, or a character deleted in a text field, moving a cursor in a text field, etc., can be recorded as a separate user interaction. In a particular case, when the user moves to a different user interface element 1110, or takes another action, such as pressing the enter key, individual user actions for that user interface element can be aggregated to provide a time taken.

However, in some implementations, the time taken between individual user actions with respect to a particular user interface element (e.g., between keystrokes) can be tracked and analyzed. For example, some fields may take a longer time for a user to fill out because the information is more voluminous. Other fields may not include as much information, but may take longer to fill out. Looking at the time between keystrokes can provide an indication as to whether the user is consistently typing text, so that the time may be related to a volume of information, or whether there are significant pauses, which may indicate that the user interface is confusing for the user. Similarly, the number of discrete events with a user interface element may be used to determine whether a longer interaction is "normal."

Figure 13:
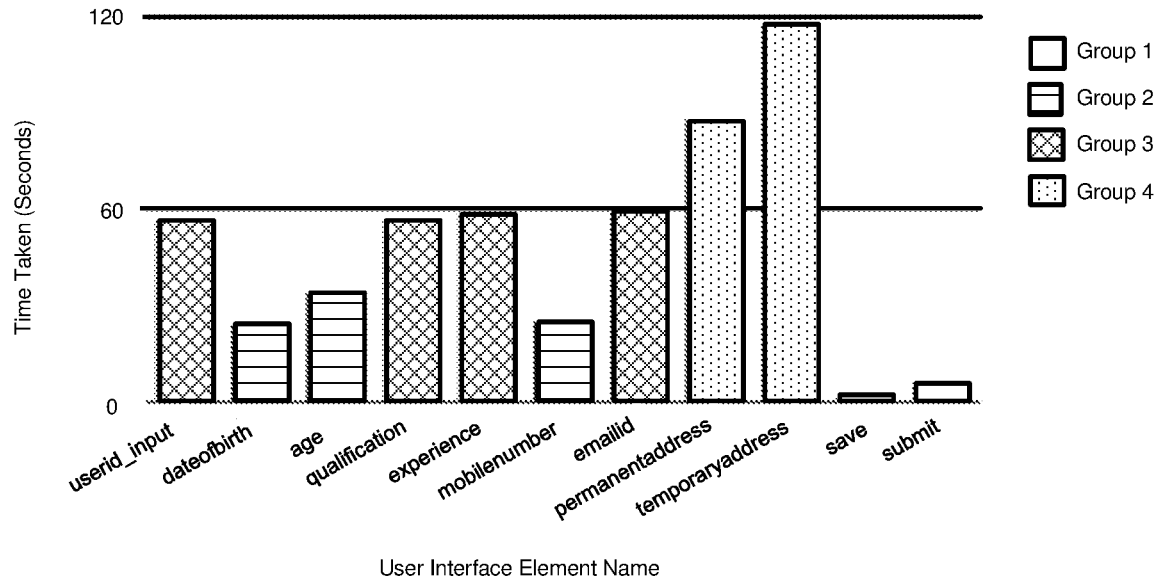
FIG. 13 is the graph of FIG. 12 updated to show how user interface elements can be grouped, or categorized, based on similarities between interaction times.

FIG. 13 illustrates how user interactions can be grouped based on interaction time, which can then be used to establish baseline behavior for user interface elements, such as a normal time range for interacting with the user interface elements. The user interface elements 1110 are shown as being divided into four groups, having different interaction time ranges. Although four groups are shown, the number of groups, and the interaction time range for each group, can vary as desired.

Note while the buttons 1110b are in a common group, the text fields 1110a are distributed between three groups. While some embodiments can assign user interface elements of the same type to different groups, in other embodiments user interface elements of the same type can be assigned to common groups. However, user interface elements can be assigned to sub-types and grouped in that way, such as having complicated text fields and easy text fields, or long text fields and short text fields.

Although data from a single user is shown, data similar to FIGS. 12 and 13 can be obtained from multiple users and used for training purposes. Once a machine learning component, such as one based on a regression approach, has been trained, test user data can be analyzed. In a particular example, the test user data is obtained using a user interface that has the same, or at least some common, user interface elements as a user interface used to obtain the training data, but the user interface elements may be displayed in a different manner. The analysis can be similar to FIGS. 12 and 13, but with the additional step that user interface element interaction times are compared with a normal range or threshold for the group. If the user interaction time is identified as an outlier, action can be taken, such as displaying information to the user or providing a notification to a developer.

Figure 14:
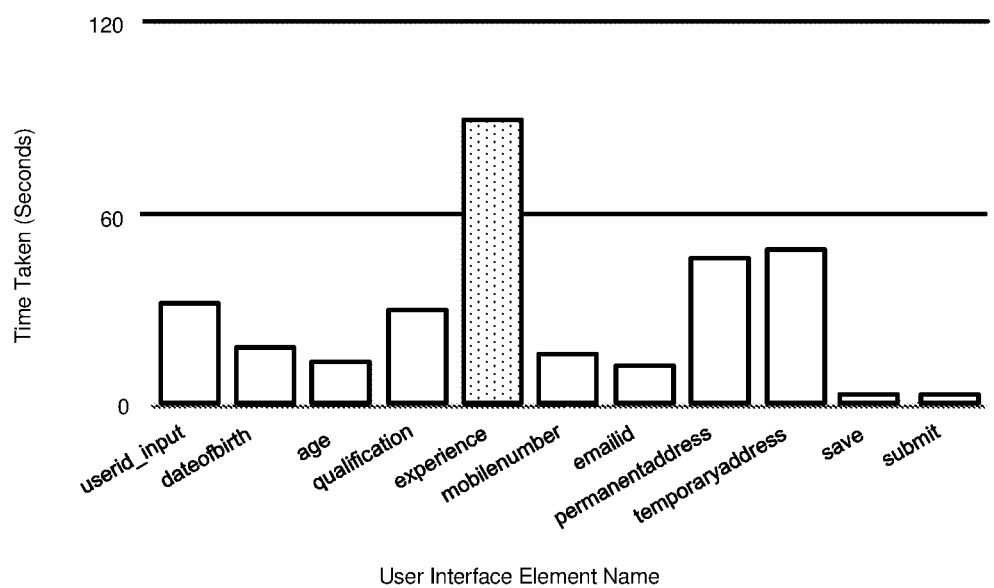
FIG. 14 is a graph of test user interface data obtained using the user interface screen of FIG. 11, analyzed using a machine learning component trained using the data of FIG. 13, illustrating how user interface element interactions with excessive interaction times can be identified using disclosed technologies.

FIG. 14 illustrates a graph of user interface element interaction times, where most user interface element interactions are within the normal range, but one element, "experience" has been identified as an outlier. As explained above, in some cases, determining whether an interaction is an outlier can include determining whether a time associated with an interaction varies more than a specified amount from a threshold time established for the group. However, in other implementations, determining whether an interaction is an outlier can be determined in additional or alternative manners. For example, a threshold time can be set, such as for a group, or for any interaction (regardless of group), and an alert can be generated if the threshold is not met (e.g., a particular value is reached or exceeded). The threshold time can be generated in various manners, such as by mathematical/statistical analysis of interaction times, which may, in some cases, take group information into account. Or, the threshold can be determined by taking an average or weighted average and setting the threshold as a certain percentage higher than the average value. In the example of FIG. 14, a threshold might be determined as 60 seconds, with any interaction exceeding 60 seconds being flagged as potentially indicating a user interface issue.

If a user interface issue is determined to potentially exist for one user, the issue can be flagged for review in data (historical, ongoing, or prospective) for other users, and analyzed to help determine if the issue primarily results from a particular user having an abnormal interaction with the user interface or with an issue with the user interface itself. In some cases, determining that a threshold interaction time has been exceeded can result in more detailed tracking of interactions with that user interface element. Or, a threshold time can be adjusted, such lowering the threshold so that smaller deviations are flagged as associated with the potential user interface issue. The data from multiple users can then be compared to determine whether a user interface should be revised (e.g., if the interaction issues result primarily from a user or from the user interface design).

Figure 15A:
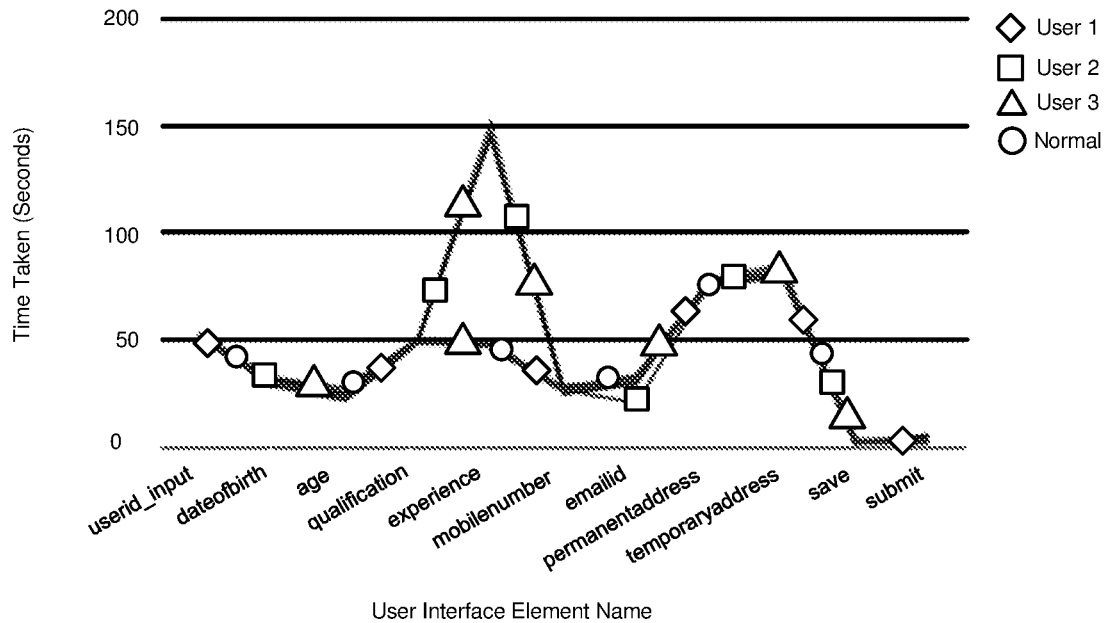
FIG. 15A is a graph of user interaction times of multiple users with various user interface elements, and for baseline times for interacting with such user interface elements, illustrating how disclosed technologies can identify user interface elements with potential design issues, or users having problems with a user interface, by comparing information from multiple users.

FIG. 15A illustrates how data from multiple users, and optionally a "normal" or baseline time, can be compared. The data indicates that most users interact with user interface elements within the expected time, except that two users have spikes for the "experience" user interface element. The fact that multiple users have exceeded expected times for this element can be an indication of a user interface design issue.

Although the present disclosure has primarily discussed user interface issues in the context of the graphical presentation of user interface elements, where problems arise from the size, labelling, position, etc. of elements, user interface issues can have other causes, and the disclosed techniques can be used to identify or address such causes. For example, other types of user interface issues can result from problems with the code responsible for carrying out a particular command that is triggered by a user interface element (e.g., a problem with the controller). Problems can also associated with the model portion of a user interface, such as having incorrectly mapped data.

As an example, an entry field user interface element (e.g., for entering numerical, alphabetical, or alphanumeric values) may be incorrectly set, such as not accepting certain types of characters or having an incorrect length (e.g. being too short to enter a phone number). Or, a button or other user interface element may fail to take the action expected by a user. For instance, if a user selects a "next" or "submit" button, the user may expect to see a new user interface screen, such as a confirmation screen or a next page of a form. User interaction patterns with the user interface elements may reveal the existence of these kinds of issues, and potentially suggest how they may be addressed, including in an automated manner.

Figure 15B:
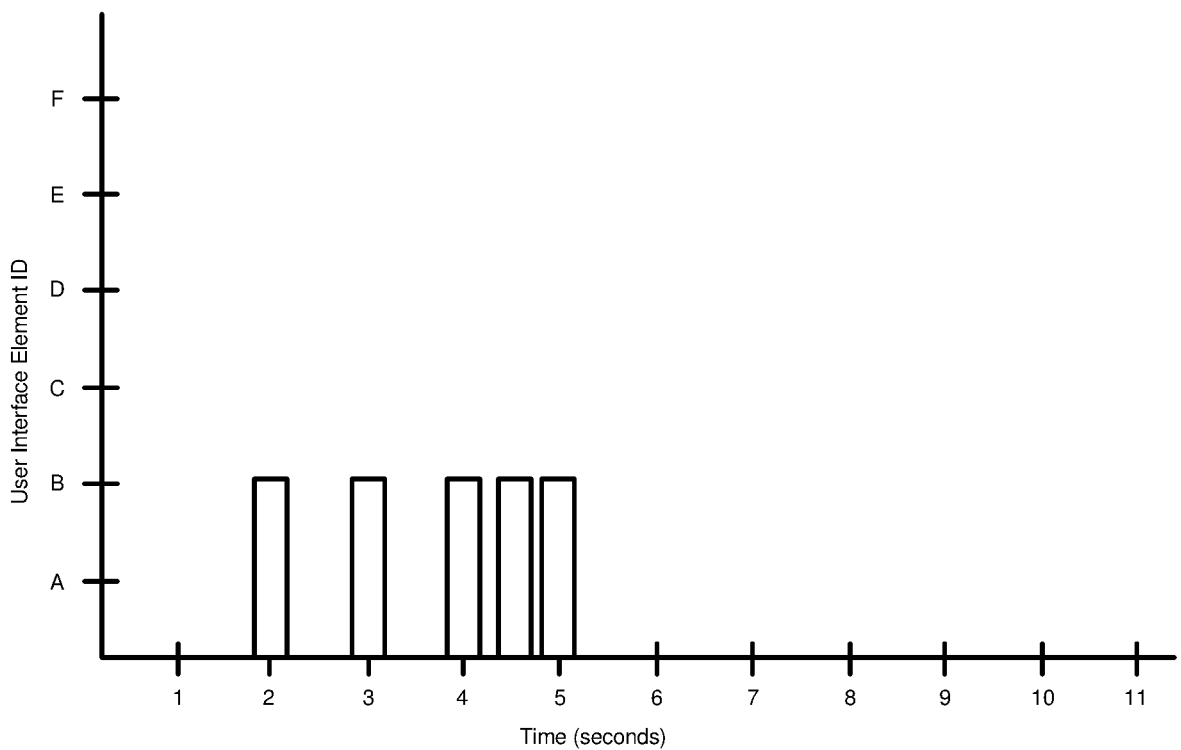
FIG. 15B is a graph of user interactions with a single user interface element, indicating a possible user interface design issue resulting from actions expected by the user not being performed when the user selects the user interface element.

FIG. 15B illustrates example user interaction data. Prior user interaction data may be normal, showing the user interacting with a variety of user interface elements in an expected time frame. However, the data in FIG. 15B shows the user repeatedly activating or selecting the same user interface element, element "B". In some cases, if the same user interface element is repeatedly activated in a set time frame, or is activated a certain number of times in a row, a potential user interface issue may be identified. In addition, this issue can be classified as code or operation related issue, as opposed to a graphical design issue.

Other types of user interaction data can be used to help identify instances where a control may be properly selected by a user, in an expected timeframe, but may not perform the action expected by a user. For example, selection of the same user interface element at progressively shorter intervals may indicate that a user is becoming frustrated. Or, repeated selection of the same user interface element followed by performing "back" or "refresh" actions can indicate that the user believes that the expected action did not occur.

Example 12—Example User Interface Analysis Operations

Figures 16A, 16B:
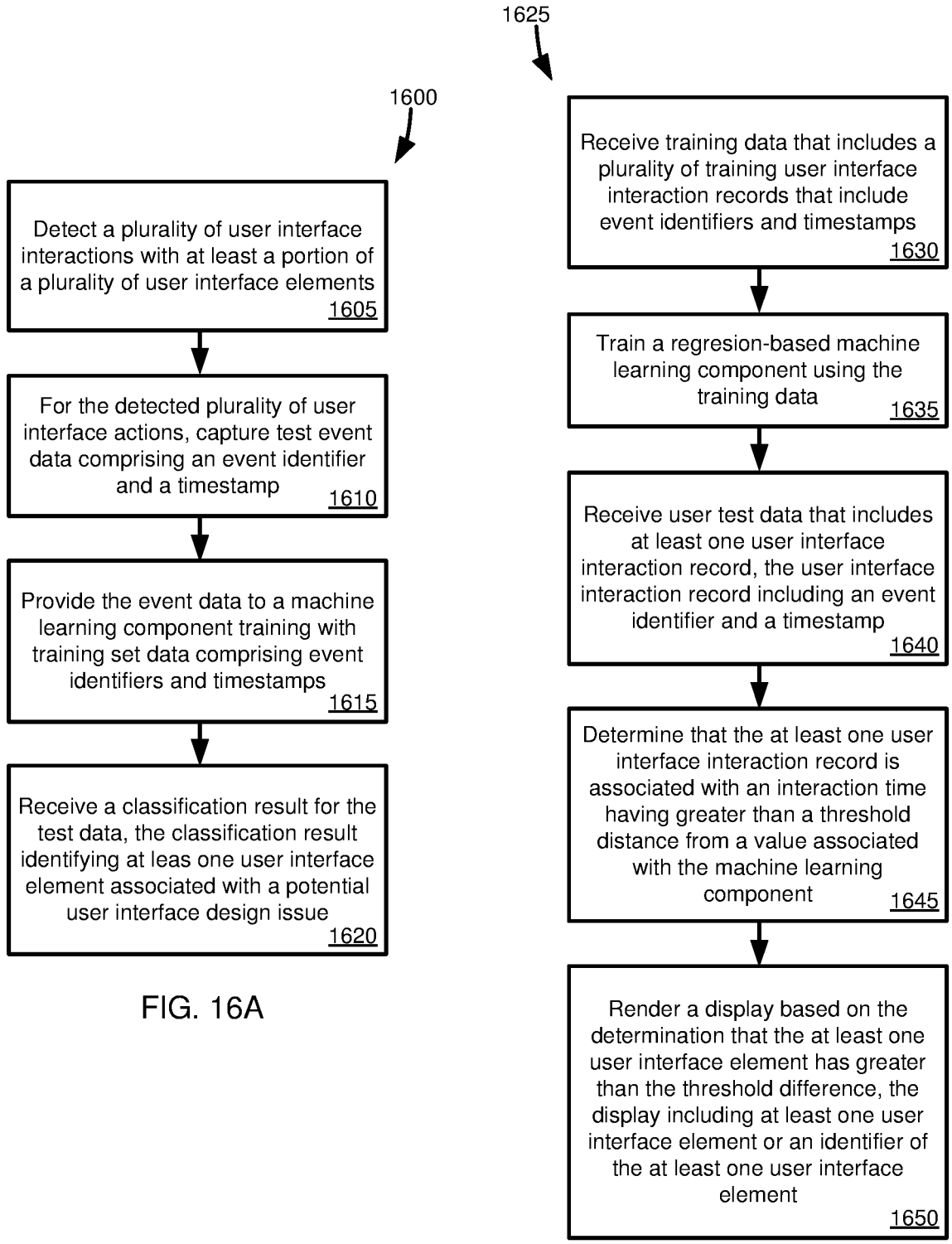
FIG. 16A is a flowchart illustrating operations for detecting potential user interface design issues using a trained machine learning component.
FIG. 16B is a flowchart illustrating operations for training a machine learning component to detect potential user interface design issues and detecting potential user interface design issues from test data.

FIG. 16A is a flowchart of an example method 1600 of detecting user interface design issues. The method 1600 can be performed, in some examples, using the computing environment 400 of FIG. 4. A plurality of user interface interactions with at least a portion of a plurality of user interface elements are detected at 1605. At 1610, test event data is captured for the detected plurality of user interface actions. The test event data includes an event identifier and a timestamp.

The test event data is provided to a machine learning component at 1615. The machine learning component was trained with training set data that includes event identifiers and timestamps. At 1620, a classification result is received. The classification result identifies at least one user interface element associated with a potential design issue.

FIG. 16B is a flowchart of an example method 1625 of method that can be carried out using a system the implements a user interface design analyzer. The system can be implemented in, for example, the computing environment 400 of FIG. 4. At 1630, training data is received that includes a plurality of training user interface interaction records. The training user interface interaction records include event identifiers and timestamps.

A regression-based machine learning component is trained at 1635 using the training data. At 1640, test data is received that includes at least one training user interface interaction record. The at least one training user interface interaction record includes an event identifier and a timestamp. It is determined at 1645 that the at least one test user interaction record is associated with a user interface element interaction time having greater than a threshold distance from a value associated with training data. A display is rendered at 1650 based on the determination that the at least one user interface element has greater than the threshold difference. The display includes the at least one user interface element or an identifier of the at least one user interface element.

Figure 16C:
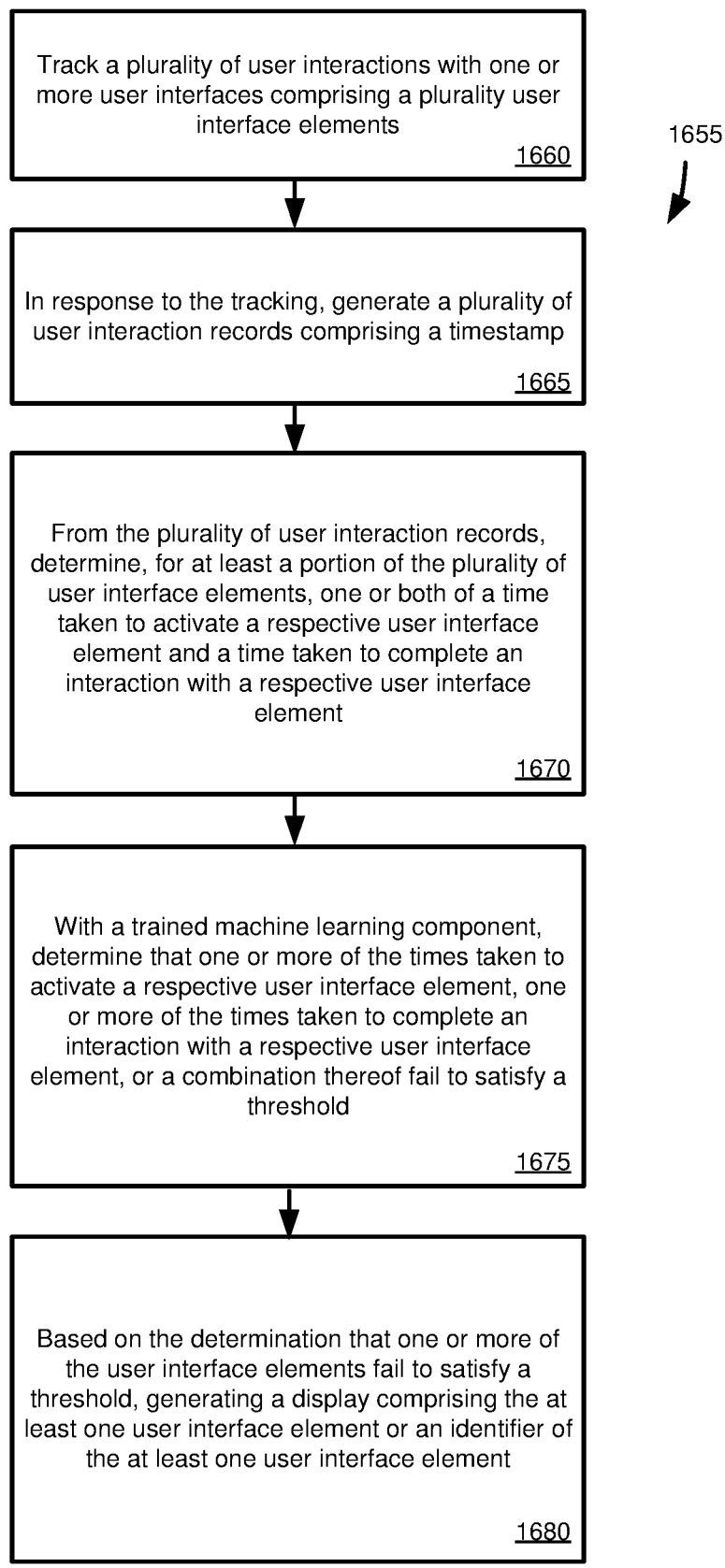
FIG. 16C is a flowchart illustrating operations for tracking user interactions with a plurality of user interface elements and detecting interactions having abnormal or undesirable interaction times.

FIG. 16C is a flowchart of a method 1655 for facilitating the improvement of user interface designs. The method 1655 can be implemented, in some cases, using the computing environment 400 of FIG. 4. At 1660 a plurality of user interactions with one or more user interfaces that include a plurality of user interface elements are tracked. In response to the tracking, at 1665, a plurality of user interaction records are generated. The user interaction records include timestamps. At 1670, from the plurality of user interface records, one or both of a time taken to activate a respective user interface element and a time taken to complete an interaction with a respective user interface element are determined. Using a trained machine learning component, at 1675, it is determined that one or more of the times taken to activate a respective user interface element, one or more of the times taken to complete an interaction with a respective user interface element, or a combination thereof, fail to satisfy a threshold. At 1680, in response to determining that one or more of the user interface elements fail to satisfy a threshold, a display is generated that includes the at least one user interface element or an identifier of the at least one user interface element.

Example 13—Computing Systems

Figure 17:
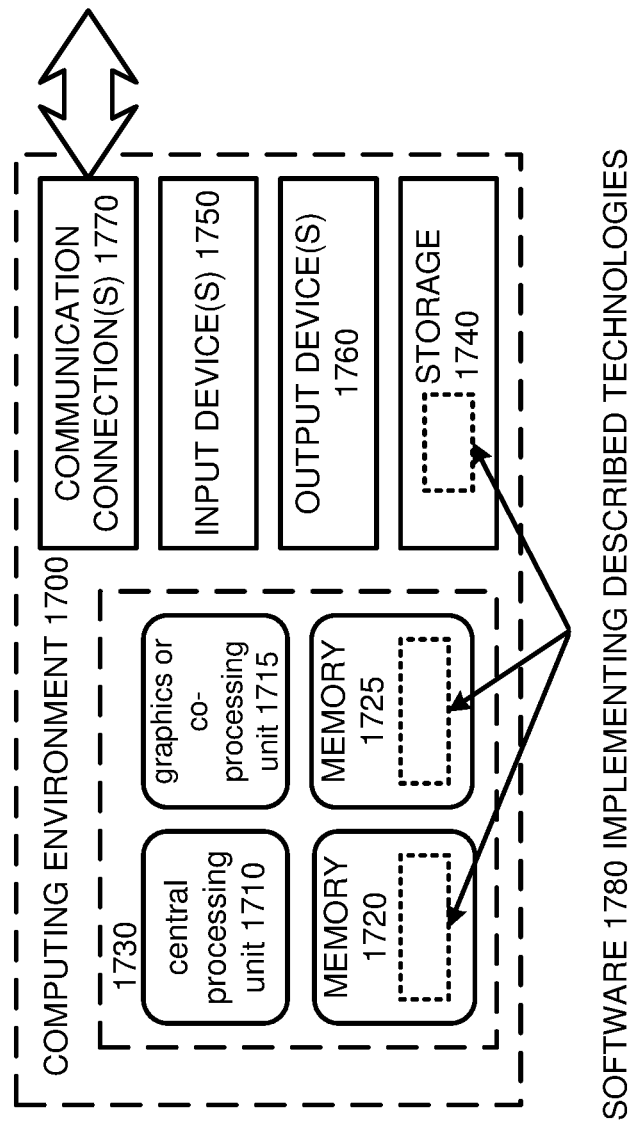
FIG. 17 is a diagram of an example computing system in which some described embodiments can be implemented.

FIG. 17 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions, such as for implementing components of the architecture 700 of FIG. 7, including as further described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 18:
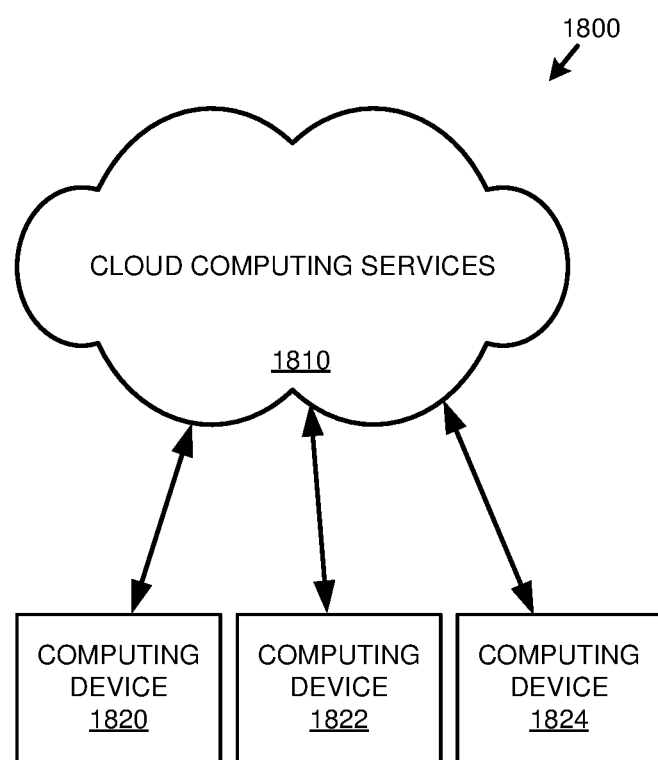
FIG. 18 is an example cloud computing environment that can be used in conjunction with the technologies described herein.

FIG. 18 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operators (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1720 and 1725, and storage 1740. The term computer-readable storage media does not include signals and carrier waves. In addition, the term computer-readable storage media does not include communication connections (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more memories;
one or more processing units coupled to the one or more memories; and
one or more computer readable storage media storing instructions that, when executed, cause the computing system to perform operations comprising:
detecting a plurality of user interface actions with at least a portion of a plurality of user interface elements;
for respective user interface action of the detected plurality of user interface actions, capturing test event data comprising an event identifier and a timestamp, wherein the event identifier identifies at least one user interface element associated with the user interface action, the timestamp comprises temporal information of the identified at least one user interface element, and the at least one user interface element associated with the user interface action is associated with a potential user interface design issue;
providing the test event data to a machine learning component, the machine learning component comprising a classifier, the classifier having been trained with a training data set, members of the training data set comprising training event data comprising event identifiers and timestamps;
with the classifier, determining that the at least one user interface element is associated with a user interface element interaction time having greater than a threshold difference from a value associated with the classifier; and
receiving a classification result from the classifier, the classification result identifying the at least one user interface element as exceeding a threshold user interface element interaction time.

2. The computing system of claim 1, the processing further comprising receiving user input revising code defining the at least one user interface element.

3. The computing system of claim 1, wherein the classification result comprises a description of a problem that may be the source of the potential user interface design issue.

4. The computing system of claim 1, wherein the classification result comprises a description of a solution type that may address the potential user interface design issue.

5. The computing system of claim 1, wherein the classification result comprises an identifier of an implementation of a solution that may address the potential user interface design issue.

6. The computing system of claim 1, wherein the user interface element interaction time comprises a time taken to activate a respective user interface element.

7. The computing system of claim 1, wherein the machine learning component compresses a regression method.

8. The computing system of claim 7, wherein the regression method is selected from linear regression, logistic regression, polynomial regression, stepwise regression, ridge regression, lasso regression, and elasticNet regression.

9. The computing system of claim 1, the processing further comprising rendering the classification result for display.

10. The computing system of claim 1, the processing further comprising rendering for display at least one message to a user to guide the user in selecting or completing at least a first user interface element of the plurality of user interface elements.

11. The computing system of claim 1, the processing further comprising:
for the detected plurality of user interface actions, capturing one or more of an application identifier, a page, screen, or view identifier, a user interface element identifier, or an event type identifier.

12. The computing system of claim 1, the processing further comprising:
for the detected plurality of user interface actions, capturing a user interface element identifier.

13. The computing system of claim 1, wherein, for at least a portion of the plurality of user interface elements, activation of a user interface element by a user activates an event handler, wherein the event handler comprises code generating the test event data.

14. The computing system of claim 1, wherein the machine learning component is trained with user input data for a plurality of user interfaces.

15. The computing system of claim 14, wherein the plurality of user interfaces are associated with a plurality of software applications.

16. One or more non-transitory computer-readable storage media comprising:
- computer-executable instructions that, when executed by a computing system comprising at least one hardware processor and at least one memory coupled to the at least one hardware processor, cause the computing system to receive training data comprising a plurality of training user interface interaction records, the training user interface interaction records comprising event identifiers and timestamps;
- computer-executable instructions that, when executed by the computing system, cause the computing system to train a regression-based machine learning component using the training data;
- computer-executable instructions that, when executed by the computing system, cause the computing system to receive test data comprising at least one test user interface interaction record, the test user interface record comprising an event identifier and a timestamp, wherein the event identifier identifies at least one user interface element associated with the test user interface record and the timestamp comprises temporal information of the at least one user interface element;
- computer-executable instructions that, when executed by the computing system, cause the computing system to, with the trained machined learning component, determine that the at least one user interface element is associated with a user interface element interaction time having greater than a threshold difference from a value associated with the machine learning component; and
- computer-executable instructions that, when executed by the computing system, cause the computing system to render a display based on the determining that the user interface element interaction time has greater than a threshold difference, the display comprising a user interface element associated with the user interface element interaction time or an identifier of a user interface element associated with the user interface element interaction time.

17. A method, implemented in a computing system comprising at least one memory and at least one hardware processors coupled to the at least one memory, the method comprising:
- tracking a plurality of user interactions with one or more user interfaces comprising a plurality of user interface elements;
- in response to the tracking, generating a plurality of user interaction records, the user interaction records comprising an event identifier and a timestamp, wherein the event identifier identifies at least one user interface element associated with the user interaction records;
- from the plurality of user interaction records, determining, for at least a portion of the plurality of user interface elements, a time taken to activate a respective user interface element;
- with a trained machine learning component, determining that the time taken to activate the respective user interface element has greater than a threshold difference from a value associated with the event classifier; and
- based on the determining that the time taken to activate a respective user interface element has greater than a threshold difference from a value associated with the event classifier, generating a display comprising the respective user interface element or an identifier of the respective user interface element.

18. The method of claim 17, further comprising:
- training the machine learning component with a plurality of training user interaction records, the plurality of training user interaction records comprising timestamps.

19. The method of claim 17, wherein the training user interaction records comprise information to assist in improving a potential user interface design issue, and wherein the display comprises the information.

20. The method of claim 17, wherein at least a portion of the plurality of user interface elements are associated with a workflow, the method further comprising:
- in the display, displaying information guiding a user through the workflow.

* * * * *